United States Patent [19]

Meininger et al.

[11] Patent Number: 4,730,038

[45] Date of Patent: Mar. 8, 1988

[54] WATER-SOLUBLE DISAZO COMPOUNDS OF 1-AMINO-8-NAPHTHAL-3,6- OR 4,6-DISULFONIC ACID AS BIVALENT COUPLING COMPONENT, CONTAINING FIBER-REACTIVE GROUPS SUITABLE AS DYESTUFFS

[75] Inventors: Fritz Meininger; Ernst Hoyer, both of Frankfurt am Main; Rudolf Fass, Kelkheim, all of Fed. Rep. of Germany

[73] Assignee: Hoechst Aktiengesellschaft, Frankfurt am Main, Fed. Rep. of Germany

[21] Appl. No.: 811,303

[22] Filed: Dec. 16, 1985

Related U.S. Application Data

[63] Continuation of Ser. No. 713,566, Mar. 18, 1985, abandoned, which is a continuation of Ser. No. 549,638, Nov. 7, 1983, abandoned, which is a continuation of Ser. No. 379,934, May 19, 1982, abandoned.

[30] Foreign Application Priority Data

May 21, 1981 [DE] Fed. Rep. of Germany ....... 3120187

[51] Int. Cl.$^4$ .................... C09B 62/09; C09B 62/513; D06P 1/382; D06P 1/384
[52] U.S. Cl. ................................. 534/637; 534/598; 534/617; 534/642; 534/638
[58] Field of Search ................ 534/637, 618, 642, 617

[56] References Cited

U.S. PATENT DOCUMENTS

| | | | |
|---|---|---|---|
| 3,223,470 | 12/1965 | Boedeker et al. | 534/618 |
| 4,242,258 | 12/1980 | Noll et al. | 534/618 |
| 4,425,270 | 1/1984 | Yamada et al. | 534/637 |

FOREIGN PATENT DOCUMENTS

| | | | |
|---|---|---|---|
| 2437426 | 7/1980 | France | 534/618 |
| 2034343 | 6/1980 | United Kingdom | 534/618 |

*Primary Examiner*—Floyd D. Higel
*Attorney, Agent, or Firm*—Curtis, Morris & Safford

[57] ABSTRACT

Water-soluble disazo compounds having fiber-reactive dyestuff properties of the general formula (1)

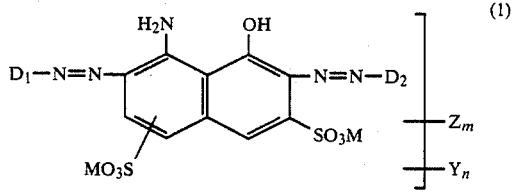

in which $D_1$ and $D_2$ are identical or different and each represents a phenyl radical or a naphthyl radical, both of which are substituted by a group of the formula moiety Y or formula moiety Z defined below and can additionally be substituted by one or two substituents from the group comprising sulfo, chlorine, bromine, lower alkyl and lower alkoxy, Z is a group of the formula (2a), (2b), (2c), (2d), (2e) or (2f)

$$-SO_2-CH_2-CH_2-X \quad (2a)$$

$$-\underset{R}{N}-SO_2-CH_2-CH_2-X \quad (2b)$$

$$-CH_2-SO_2-CH_2-CH_2-X \quad (2c)$$
$$-SO_2-CH=CH_2 \quad (2d)$$

$$-\underset{R}{N}-SO_2-CH=CH_2 \quad (2e)$$

$$-CH_2-SO_2-CH=CH_2 \quad (2f)$$

in which R denotes an alkyl group having 1 to 4 C atoms and X denotes a chlorine atom, the acetoxy group, the thiosulfate group, the phosphate group or the sulfato group; Y is a radical of the formula (3)

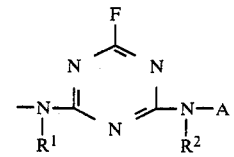

in which $R^1$ and $R^2$ are identical to or different from one another and each denotes hydrogen or alkyl having 1 to 4 C atoms, and A is hydrogen or an optionally substituted alkyl group having 1 to 6 C atoms or a radical of the formula (4)

$$-B-Z \quad (4)$$

in which B is the phenylene radical or a naphthylene radical, both of which can be substituted by one or two substituents chosen from the set comprising a sulfo group, a chlorine atom, one or two methyl or ethyl groups and one or two methoxy or ethoxy groups, and Z has the abovementioned meaning; n is the number 1 or 2 and m is the number zero or 1, and the sum (m+n) is equal to 2, and M denotes hydrogen or the equivalent of a metal, preferably sodium or potassium; the compounds of the general formula (1) must contain at least three radicals selected from those of formulae (2a) to (2f) defined above and from the group of formula

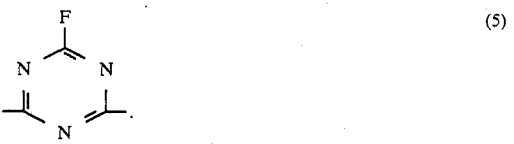

The compounds of the general formula (1) produce, for example on cellulose fiber materials, wool and synthetic polyamide fiber materials, fast and intensely colored, navy to black dyeings and prints.

9 Claims, No Drawings

WATER-SOLUBLE DISAZO COMPOUNDS OF 1-AMINO-8-NAPHTHAL-3,6- OR 4,6-DISULFONIC ACID AS BIVALENT COUPLING COMPONENT, CONTAINING FIBER-REACTIVE GROUPS SUITABLE AS DYESTUFFS

This application is a continuation, of application Ser. No. 713,566, filed Mar. 18, 1985, now abandoned, 549,638 filed Nov. 7, 1983 now abandoned, which is a continuation of Ser. No. 379,934 filed May 19, 1982 now abandoned.

The present invention relates to new water-soluble disazo compounds which have the general formula (1)

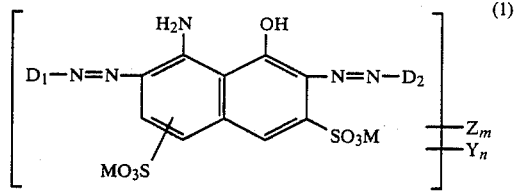

in which $D_1$ and $D_2$ each represent a phenyl radical or a naphthyl radical, both of which are substituted by a group of the formula moiety Y or formula moiety Z defined below and can additionally be substituted by one or two substituents selected from the group consisting of sulfo, chlorine, bromine, lower alkyl, such as ethyl and in particular methyl, and lower alkoxy, such as ethoxy and in particular methoxy, and $D_1$ and $D_2$ can have meanings which are identical to or different from one another; Z is a group of the formula (2a), (2b), (2c), (2d), (2e) or (2f)

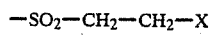  (2a)

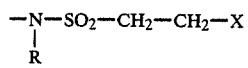  (2b)

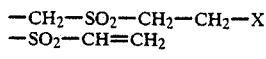  (2c)
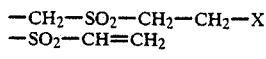  (2d)

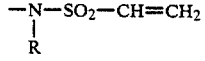  (2e)

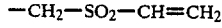  (2f)

in which R is an alkyl group having 1 to 4 C atoms, preferably the methyl group, and X denotes a chlorine atom or the acetoxy group or a thiosulfato group of the general formula —S—$SO_3M$ (in which M has the meaning mentioned below) or a phosphato group of the general formula —O—$PO_3M_2$ (in which M has the meaning mentioned below) or preferably a sulfato group of the general formula —$OSO_3M$ (in which M has the meaning mentioned below); Y is a radical of the formula (3)

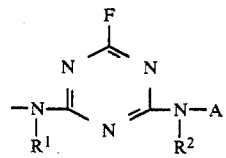  (3)

in which $R^1$ is a hydrogen atom or an alkyl group having 1 to 4 C atoms and $R^2$ is a hydrogen atom or an alkyl group having 1 to 4 C atoms, and $R^1$ and $R^2$ can have meanings which are identical to or different from one another, and A is a hydrogen atom or an alkyl group having 1 to 6 carbon atoms which can be substituted, for example by one or two substituents from the group comprising methoxy, ethoxy, hydroxy, acetoxy, phosphato, sulfato, sulfo, carboxy, phenyl and sulfophenyl, or is a phenyl radical which can be substituted by substituents from the group comprising methyl, ethyl, methoxy, ethoxy, chlorine, bromine, carboxy, sulfo, carbamoyl and sulfamoyl, or is a radical of the formula (4)

  (4)

in which B is the phenylene radical or a naphthylene radical, both of which can be substituted by one or two substituents chosen from the set comprising one sulfo group, one chlorine atom, one or two methyl or ethyl groups and one or two methoxy or ethoxy groups, and Z has the abovementioned meaning; n is the number 1 or 2 and m is the number zero or 1, and the sum (m+n) is equal to 2, and the compound of the formula (1) must contain at least three of the required radicals belonging to the groups of formulae (2a) to (2f) defined above and of the formula (5)

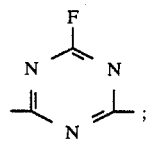  (5)

M is a hydrogen atom or the equivalent of a metal, such as, for example, of the 1st, 2nd and 3rd main group, preferably a 1- or 2-valent metal, such as an alkali metal and alkaline earth metal, in particular sodium, potassium and calcium.

These new compounds can be in the form of a free acid and in the form of their salts. They are preferably in the form of the salts, in particular the alkali metal and alkaline earth metal salts, particularly preferably as sodium salts, potassium salts and also calcium salts. They are preferably used in the form of the alkali metal salts for dyeing materials, preferably fiber materials, which contain hydroxy groups and/or carbonamide groups.

The present invention also relates to a process for preparing the new disazo compounds of the general formula (1), which comprises reacting equimolar amounts of 1-amino-8-naphthol-4,6-disulfonic acid or 1-amino-8-naphthol-3,6-disulfonic acid with a diazonium compound of an amine of the general formula (6)

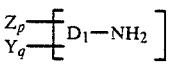  (6)

in which $D_1$, Z and Y have the abovementioned meanings and p and q each represent the numbers zero or 1, and reacting the resulting product with a diazonium compound of an amine of the general formula (7)

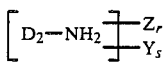

(7)

in which $D_2$, Z and Y have the abovementioned meaning and r and s each represent the number zero or 1, and in these reactions coupling the first diazonium compound in the o-position relative to the amino group of the amino-naphtholsulfonic acid to give the monoazo compound and introducing the second diazonium compound into the o-position relative to the hydroxy group of the monoazo compound formed, the amines of the general formulae (6) and (7) being so chosen that the sum (p+q) is equal to 1, the sum (r+s) is equal to 1, the sum (p+r) is equal to zero or 1 and the sum (q+s) is equal to 1 or 2.

In the diazo components of the general formulae (6) and (7), the formula moieties $D_1$, $D_2$, Z and Y can have meanings which are identical to one another or different from one another and, in one and the same amino compound, the formula moieties $R^1$ and $R^2$ each can have identical or different meanings to one another. Furthermore, the radical Z which may be present in Y can be different from the radical Z which may be present in and directly bonded to $D_1$ or $D_2$. The two amines used in the reaction for preparing the disazo compounds according to the invention can thus have a structure which is identical to or different from one another.

The amines of the general formulae (6) and (7) are diazotized in a known and customary manner, with which an expert is familiar, for example by means of nitrous acid (alkali metal nitrite and a strong acid), nitrosylsulfuric acid or a lower alkyl nitrite.

The coupling reaction of the diazotized amine of the general formula (6) or (7) with 1-amino-8-naphthol-3,6- or -4,6-disulfonic acid is first carried out in an acid medium, such as at a pH value between 0 and 4, preferably between 0.5 and 3, and, for example, at a temperature between 0° C. and 25° C., analogously to known procedures, so that this first diazonium compound is coupled in the ortho-position relative to the amino group of the amino-naphthol; thereafter the coupling with the second diazo component is carried out in a weakly acid to a weakly alkaline medium, such as at a pH value between 4 and 8, preferably between 4.5 and 7.5, and, for example, at a temperature between 0° and 30° C., analogously to known procedures, with the result that the coupling is effected in the ortho-position relative to the hydroxy group of the aminonaphthol radical of the monoazo compound formed. Such procedures are known, for example from German Pat. Nos. 960,534 and 1,644,198.

Aromatic amines of the general formula (6) and of the general formula (7) in which q is equal to zero or s is equal to zero, are described, for example in German Patent Specification Nos. 1,278,041, 1,276,842, 1,150,163, 1,126,542 and 1,153,029 and in German Offenlegungsschriften Nos. 2,154,943, 2,100,080, 2,034,591 and 1,943,904 and in German Auslegeschrift No. 1,204,666. Examples of such aromatic amines (6) and (7) are aniline-3-β-sulfatoethyl sulfone, aniline-4-β-sulfatoethyl sulfone, 2-aminotoluene-4-β-sulfatoethyl sulfone, 2-aminoanisole-4-β-sulfatoethyl sulfone, 2-aminoanisole-5-β-sulfatoethyl sulfone, 2,5-dimethoxyaniline-4-β-sulfatoethyl sulfone, 2,4-dimethoxyaniline-5-βsulfatoethyl sulfone, 2-methoxy-5-methylaniline-4-β-sulfatoethyl sulfone, 4-aminoanisole-3-β-sulfatoethyl sulfone, 4-amino-toluene-3-β-sulfatoethyl sulfone, 4-β-sulfatoethylsulfonylaniline-2-sulfonic acid, 5-β-sulfatoethylsulfonylaniline-2-sulfonic acid, 2-aminotoluene-5-β-sulfatoethyl sulfone, 2-chloroaniline-4-β-sulfatoethyl sulfone, 2-chloroaniline-5-β-sulfatoethyl sulfone, 2-bromoaniline-4-β-sulfatoethyl sulfone, 2,6-dichloroaniline-4-β-sulfatoethyl sulfone, 2,6-dimethylaniline-3-β-sulfatoethyl sulfone, 2,6-dimethylaniline-4-β-sulfatoethyl sulfone, 2-naphthylamine-5-β-sulfatoethyl sulfone, 2-naphthylamine-6-β-sulfatoethyl sulfone, 2-naphthylamine-8-β-sulfatoethyl sulfone, 8-β-sulfatoethylsulfonyl-2-aminonaphthalene-6-sulfonic acid, 6-β-sulfatoethylsulfonyl-2-aminonaphthalene-1-sulfonic acid, N-methyl-N-(β-sulfatoethylsulfonyl)-p-phenylenediamine, N-methyl-N-(β-sulfatoethylsulfonyl)-m-phenylenediamine, (4-aminobenzyl)-(β-sulfatoethyl) sulfone and (3-aminobenzyl)-(β-sulfatoethyl) sulfone and their corresponding β-chloroethyl, β-acetoxyethyl, β-phosphatoethyl, β-thiosulfatoethyl and vinylsulfonyl derivatives.

Aromatic amines of the general formula (6) and of the general formula (7) in which p is equal to zero or r is equal to zero, can be prepared, for example, by reacting a diamine of the general formula $R^1$—NH—$D_1$—$NH_2$ or $R^1$—NH—$D_2$—$NH_2$ in which $R^1$, $D_1$ and $D_2$ have the abovementioned meanings, with 2,4,6-trifluoro-s-triazine (cyanuric fluoride), for example at −5° C. to +5° C. and at a pH value between 6 and 7, and reacting the resulting product corresponding to the general formula (8a) or (8b)

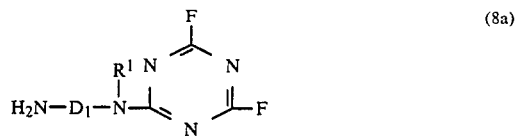

(8a)

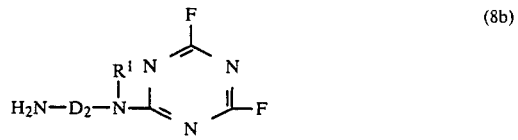

(8b)

in which $D_1$, $D_2$ and $R^1$ have the abovementioned meanings, for example at 10°–30° C. and at a pH value between 6 and 7, with an amine of the general formula $R^2NH$—A in which $R^2$ and A have the abovementioned meanings to give an amine (6) or (7) or by reversing the sequence of these two reaction steps and first reacting the amine mentioned and defined above of the general formula $R^2NH$—A with cyanuric fluoride, for example at 0° C. to 5° C. and at a pH value between 6 and 7, to give a compound of the general formula (9)

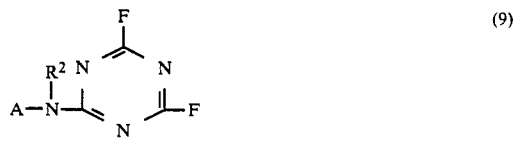

(9)

and then reacting this compound (9) in the second reaction step, for example at 20°–25° C. and at a pH value between 6 and 7, with an amine mentioned and defined above of the general formula $R^1$—NH—$D_1NH_2$ or $R^1$—NH—$D_2NH_2$. Such aromatic amines (6) or (7) in which p is equal to zero or r is equal to zero and which can be prepared by the abovementioned procedures are compounds corresponding to the general formula (10a) or (10b)

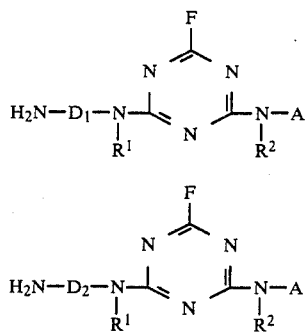

in which $D_1$, $D_2$, $R^1$, $R^2$ and A have the abovementioned meanings.

In formula (10a), the radical $H_2N-D_1-$ can denote, for example, the 3-amino-4-sulfophenyl, the 4-amino-3-sulfophenyl, 4-amino-2,5-disulfophenyl, 3-amino-4,6-disulfophenyl, 4-aminophenyl, 3-amino-3-methyl-5-sulfophenyl, 3-amino-4-chlorophenyl, 4-amino-3,5-disulfophenyl, 3-amino-4-methylphenyl, 3-amino-4-methoxyphenyl, 6-amino-4,8-disulfonaphth-2-yl, the 5-amino-3,7-disulfonaphth-1-yl or the 3-aminophenyl radical.

In formula (10b), the radical $H_2N-D_2-$ can denote, for example, the 3-amino-4-sulfophenyl, the 4-amino-3-sulfophenyl or the 4-aminophenyl radical.

Preferably, the formula moieties $R^1$ and $R^2$ in the formula (10a) each represent a hydrogen atom. In the formula (10b) the formula moieties $R^1$ and $R^2$ each preferably are a hydrogen atom or a methyl group; when $R^1$ represents a hydrogen atom and $R^2$ represents a methyl group, the radical $H_2N-D_2-$ preferably is the 3-amino-4-sulfophenyl or the 4-amino-3-sulfophenyl radical, or when $R^1$ represents a methyl group and $R^2$ represents a hydrogen atom, the radical is preferably the 4-aminophenyl radical.

In the formulae (10a) and (10b), the formula moiety A can likewise in each case represent a radical of the general formula (4a)

$$-B-Z^1 \qquad (4a)$$

in which B has the abovementioned meaning and $Z^1$ represents the β-chloroethylsulfonyl, β-acetoxyethylsulfonyl, β-thiosulfatoethylsulfonyl, β-phosphatoethylsulfonyl or the vinylsulfonyl group or preferably the β-sulfatoethylsulfonyl group. The formula moiety B in the formula (4) or (4a) is, for example, the 1,4-phenylene, 1,3-phenylene, 4-methyl-1,3-phenylene, 4-methoxy-1,3-phenylene, 3-methoxy-1,4-phenylene, 2,5-dimethoxy-1,4-phenylene, 4,6-dimethoxy-1,3-phenylene, 2-methyl-5-methoxy-1,4-phenylene, 3-chloro-1,4-phenylene, 6-methoxy-1,3-phenylene, 6-methyl-1,3-phenylene, 4-sulfo-1,3-phenylene, 4-methyl-1,3-phenylene, 4-chloro-1,3-phenylene, 3-bromo-1,4-phenylene or the 2,4-dimethyl-1,3-phenylene radical, in which the group $Z^1$ defined above is bonded in each case in the 1-position of the phenylene radicals.

The formula moiety A, corresponding to the general formula (4) or (4a), can also denote, for example, one of the abovementioned structurally indicated radicals

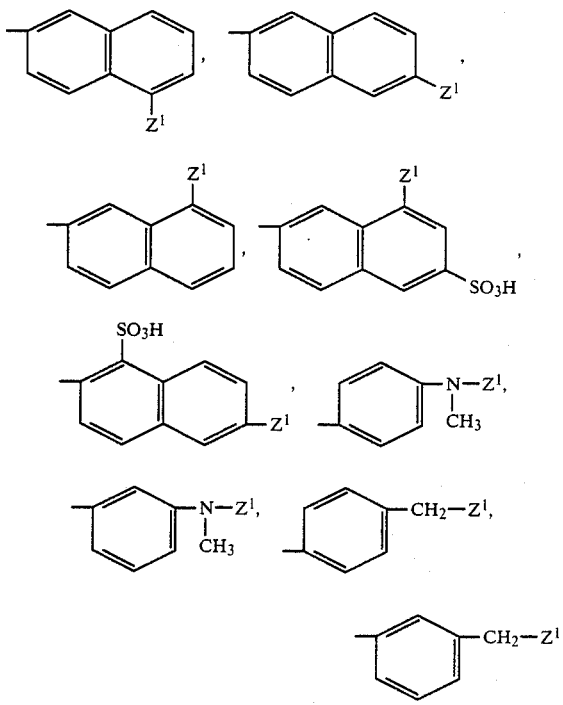

in which $Z^1$ has one of the abovementioned meanings.

Compounds corresponding to the general formula (1) and containing one or two of these diazo components (10a) and (10b) are preferable.

The compounds according to the invention and corresponding to the general formulae (11), (12), (13), (14), (15) and (16) are particularly preferable:

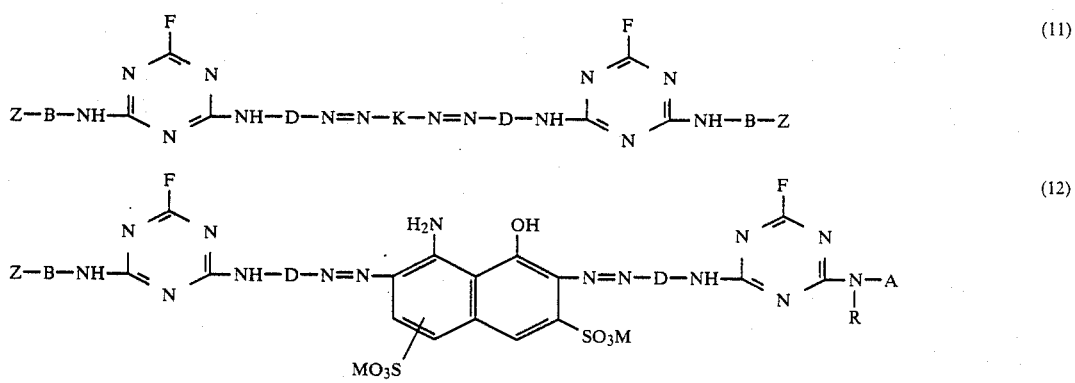

-continued

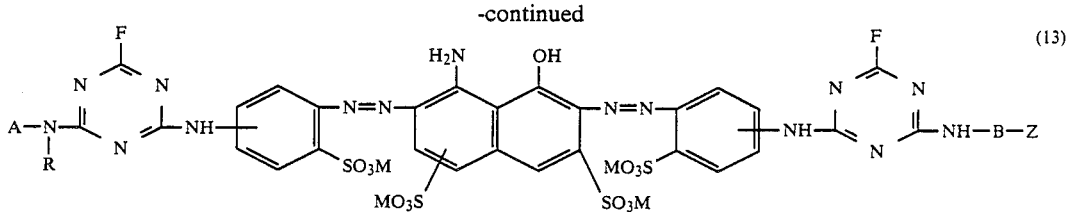

(13)

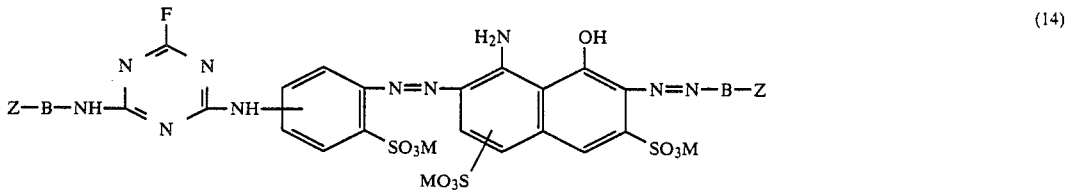

(14)

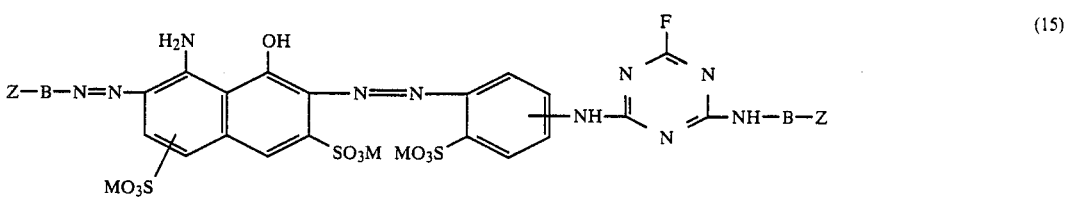

(15)

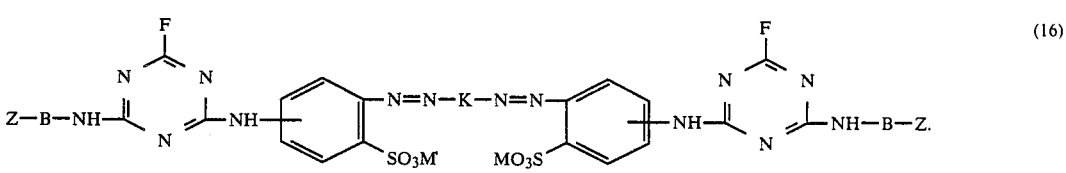

(16)

In these formulae: Z has the initially mentioned meaning, in particular that of $Z^1$, and is particularly preferably the β-sulfatoethylsulfonyl or vinylsulfonyl group; B is a phenylene radical which can be substituted by 1 sulfo group or by 1 methyl group or methoxy group or 1 chlorine atom or 2 methoxy groups or 1 methoxy group and 1 methyl group, and the two formula moieties B can be identical to or different from one another; D is a phenylene radical which can be substituted by 1 or 2 sulfo groups or 1 methoxy group, 1 methyl group or 1 chlorine atom or by 2 methoxy groups or by 1 methoxy group and 1 methyl group, and the two formula moieties D can be identical or different from one another; A is a methyl or ethyl group, a β-hydroxyethyl, β-sulfoethyl, carboxyethyl, β-sulfatoethyl or sulfophenyl group; R is a hydrogen atom, a methyl group or an ethyl group; K represents the bivalent radical of 1-amino-8-naphthol-3,6- or -4,6-disulfonic acid which serves as coupling component and can be coupled twice; M has the abovementioned meaning; the two free amino groups in the formulae (13) to (16) are bonded in the meta- or para-position relative to the azo group.

The compounds, prepared according to the invention, of the general formula (1) are separated out or isolated by generally known methods, either by precipitating them from the reaction medium by means of electrolytes, such as, for example, sodium chloride or potassium chloride, or by evaporating the reaction solution, for example by spray-drying. In many cases, it can also be desirable to use the dyestuff solution, if appropriate after the addition of buffer substances and, if appropriate, after possible concentrating, directly as liquid composition for dyeing use.

The disazo compounds according to the invention of the general formula (1) have valuable dyestuff properties and posses, due to their fluorotriazinyl component and the radical Z, fiber-reactive properties. The new compounds are preferably used for coloring (in the general sense) of materials containing hydroxy, amino or carbonamide groups, for example in the form of sheet structures, such as paper and leather, or in the mass, such as polyamide and polyurethane, in particular for such materials in fiber form.

The present invention also relates to the use of compounds of the general formula (1) for coloring (including mass-coloring and print dyeing) these materials and to processes for coloring such materials in a manner which is in itself customary, in which a compound of the general formula (1) is used as a colorant. The materials are preferably used in the form of fiber materials, in particular in the form of textile fibers.

Materials containing hydroxy groups are natural or synthetic materials containing hydroxy groups, such as, for example, cellulose fiber materials or their regenerated products, or polyvinyl alcohols. Cellulose fiber materials are preferably cotton, but also other vegetable fibers, such as linen, hemp, jute and ramie fibers or regenerated cellulose fibers, such as, for example, viscose staple and viscose rayon.

Examples of materials containing carbonamide groups are synthetic and natural polyamides and polyurethanes, in particular in the form of fibers, for example wool and other animal hairs, silk, leather, polyamide-6,6, polyamide-6, polyamide-11 and polyamide-4.

The dyestuffs according to the invention can be applied to the substrates mentioned by application techniques known for reactive dyestuffs. Thus, they produce on cellulose fibers, applied by the exhaust process from a long liquor, for example with the use of widely differing alkali additions, very good color yields.

Pad processes also produce excellent color yields on cellulose fibers, and fixing can be carried out by leaving to stand at room temperature, by steaming or by means of dry heat.

Likewise, intensely colored prints having well-delineated contours and a clear white ground are obtained by the customary printing methods for cellulose fibers, namely printed by a one-step method in the presence of sodium bicarbonate or other acid-binding agents in the print paste with subsequent steaming at 100°–103° C., or printed in two steps with a neutral or weakly acid print paste and then either being passed through a hot alkaline bath containing an electrolyte or by being padded with an alkaline padding liquor containing an electolyte and then being developed by leaving to stand, steaming or dry heat. The outcome of the prints depends only to a small extent on varying conditions of fixing. Remarkably high degrees of fixing can be obtained with the dyestuffs according to the invention both in dyeing and in printing.

The fastness properties on cellulose fibers of dyeings and prints obtained with the dyestuffs according to the invention are impressive. This is true for both the most important manufacturing fastness properties and for the most important end-use fastness properties. Particular mention should be made of the lightfastness, wet-fastness properties, such as washfastness properties, milling fastness properties, water fastness, seawater fastness, fastness to cross dyeing and perspiration fastness, as well as fastness to pleating, ironing and rubbing.

The dyeings on polyamide fibers are customarily carried out in an acid medium. Thus, for example, acetic acid or acetic acid and ammonium acetate can be added to the dyebath to obtain the desired pH value. To obtain an acceptable levelness of the dyeings it is advisable to add customary leveling agents, based, for example, on a reaction product of cyanuric chloride with the threefold molar quantity of an aminobenzenesulfonic acid and/or an aminonaphthalenesulfonic acid or based on a reaction product of, for example, stearylamine with ethylene oxide. The dyeings can be carried out not only at the boil but also up to 110°–120° C.

The Examples below serve to illustrate the invention. Unless otherwise indicated, the parts mentioned therein are parts by weight, and the values in percent represent percentages by weight. Parts by weight are related to parts by volume as the kilogram is related to the liter.

Compounds according to the invention which are described with a structural formula are as a rule shown in the form of the free acids; in general, they are produced and isolated in the form of their salts, such as potassium salts or sodium salts, and used in the form of their salts for dyeing. In particular the starting compounds described with a structural formula in the Examples in the Tables are also written in the form of their free acids; they may be used not only in the acid form but also in the form of their salts, such as sodium salts or potassium salts, in the synthesis of the disazo compounds according to the invention.

EXAMPLE 1

13.7 parts of cyanuric fluoride were added dropwise in the course of 15 minutes at 0° C. to a neutral solution of 28.1 parts of aniline-4-$\beta$-sulfatoethyl sulfone in 150 parts of water, and aqueous sodium hydroxide was added to maintain the pH at the value of 6.0. A neutral solution of 26.8 parts of 1,4-diaminobenzene-2,5-disulfonic acid in 200 parts of water was then added to the resulting reaction mixture, and the mixture thus obtained was stirred at 18° to 20° C. and at a pH value of about 6.0 to 7.0 for a few hours, during which period the pH value was maintained within the indicated range by addition, in portions, of aqueous sodium hydroxide. The reaction product formed was then in the form of a clear solution. 250 parts of ice and thereafter 60 parts by volume of a 31% strength aqueous hydrochloric acid were added to this solution; the subsequent diazotization was effected by the dropwise addition of 20 parts by volume of aqueous 5N sodium nitrite solution at a temperature of 0° to 5° C. The resulting diazonium salt solution was then added dropwise at a pH value of 2.5 to 3.0 and at a temperature of 0° to 10° C. to a solution of 31.9 parts of 1-amino-8-naphthol-3,6-disulfonic acid in 1,500 parts of water, during which addition the pH was maintained by the addition, in portions, of 63 parts of crystalline sodium acetate at this value of 2.5 to 3.0. After the coupling was complete, the monoazo compound formed was precipitated by means of potassium chloride and filtered off with suction.

The moist filter cake of this monoazo compound was dissolved in 500 parts of water. A further batch of the secondary condensation product of cyanuric chloride and aniline-4-$\beta$-sulfatoethyl sulfone, diazotized as described above, and 1,4-diaminobenzene-2,5-disulfonic acid was added dropwise to this aqueous solution of the monoazo compound, a temperature of 10° to 18° C. and a pH value of 6.0 to 6.5 being maintained. The coupling reaction was continued for 4 hours with stirring. The solution was then clarified, and the disazo compound formed was then salted out by the addition of sodium chloride. The compound was then filtered off with suction, dried at 40° to 50° C. and ground.

A black powder was obtained which contained electrolyte (predominantly sodium chloride) and the alkali metal salt, predominantly the sodium salt, of the compound of the formula

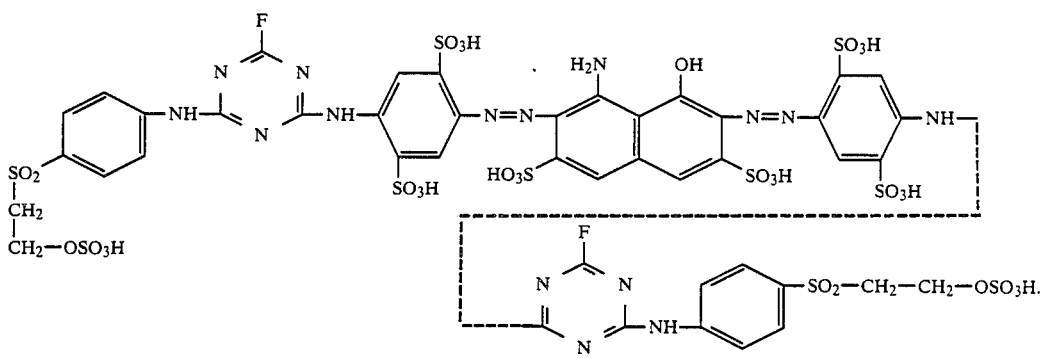

This compound had very good dyestuff properties and dyed cellulose fiber materials, such as cotton, in greenish black shades, by the dyeing, printing and fixing methods customary for reactive dyestuffs; these dyeings and prints had very good end-use and manufacturing fastness properties, such as, in particular, very good fastness to washing, perspiration, rubbing, water, acids and alkali. In the case of printing methods on cellulose fibers, the steam stability and the good behavior during rinsing can be mentioned in particular, in addition to the high degree of fixing and the identical outcome of the prints fixed according to various methods.

EXAMPLES 2 TO 42

If one of the methods according to the invention for preparing the compounds according to the invention of formula (1) was followed, thus, for example, a method analogous to the method indicated in Example 1, and for this purpose the starting compounds used in the corresponding manner were 1,3- or 1,4-diaminobenzene-2-sulfonic acid, cyanuric fluoride and an aniline or naphthylamine derivative having a $\beta$-sulfatoethylsulfonyl group, as condensation components—which can be read in the Examples in the Table below in conjunction with the general formula (A)—and were 1-amino-8-naphthol-3,6- or -4,6-disulfonic acid as coupling components, the disazo compounds according to the invention listed in the examples in the table were obtained, which had very good fastness properties and which likewise produced on natural and synthetic polyamide fiber materials, but particularly on natural and regenerated cellulose fiber materials, such as, in particular, cotton, in particular by the dyeing and printing and fixing methods customary for fiber-reactive dyestuffs, intensely colored dyeings and prints having very good fastness properties and the shades indicated in the examples in the table.

| Example | $B_1$ | Position of the NH group | Position of the $SO_3H$ group | Shade on cotton |
|---|---|---|---|---|
| 2 | $HO_3SOCH_2CH_2-O_2S$-（m-tolyl） | 4' | 3 | greenish black |
| 3 | " | 3' | 3 | blue black |
| 4 | " | 4' | 4 | black |
| 5 | " | 3' | 4 | navy |
| 6 | $HO_3SOCH_2CH_2-O_2S$-（p-phenyl） | 4' | 4 | navy |
| 7 | " | 3' | 4 | reddish navy |
| 8 | $HO_3SOCH_2CH_2-O_2S$-（2-OCH$_3$, 5-CH$_3$ phenyl） | 4' | 3 | dark grey |
| 9 | " | 3' | 3 | blue black |

-continued

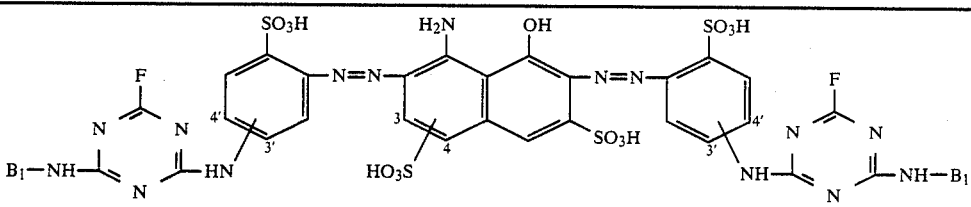
(A)

| Example | B₁ | Position of the NH group | Position of the SO₃H group | Shade on cotton |
|---|---|---|---|---|
| 10 | " | 4' | 4 | dark blue |
| 11 | " | 3' | 4 | reddish navy |
| 12 | HO₃SOCH₂CH₂—O₂S— (2,5-dimethoxyphenyl with OCH₃ groups) | 4' | 3 | dark blue |
| 13 | " | 3' | 3 | dark blue |
| 14 | " | 4' | 4 | navy |
| 15 | " | 3' | 4 | reddish navy |
| 16 | HO₃SOCH₂CH₂—O₂S—N(CH₃)—(p-tolyl) | 4' | 3 | dark grey |
| 17 | " | 3' | 3 | navy |
| 18 | HO₃SOCH₂CH₂SO₂—H₂C—(phenyl) | 3' | 3 | black |
| 19 | " | 4' | 3 | black |
| 20 | " | 3' | 4 | black |
| 21 | HO₃SOCH₂CH₂—O₂S—(phenyl) | 4' | 3 | greenish navy |
| 22 | " | 3' | 3 | reddish navy |
| 23 | HO₃SOCH₂CH₂—O₂S—(3-methyl-4-methylphenyl) | 4' | 3 | greenish black |
| 24 | " | 3' | 3 | blue black |
| 25 | " | 4' | 4 | greenish navy |
| 26 | HO₃SOCH₂CH₂—O₂S—(3-methyl-4-methylphenyl) | 3' | 4 | black |
| 27 | HO₃SOCH₂CH₂—O₂S—(2,4-dimethoxy-5-methylphenyl) | 3' | 3 | greenish black |
| 28 | " | 4' | 3 | blue black |
| 29 | " | 3' | 4 | navy |
| 30 | " | 4' | 4 | navy |

-continued

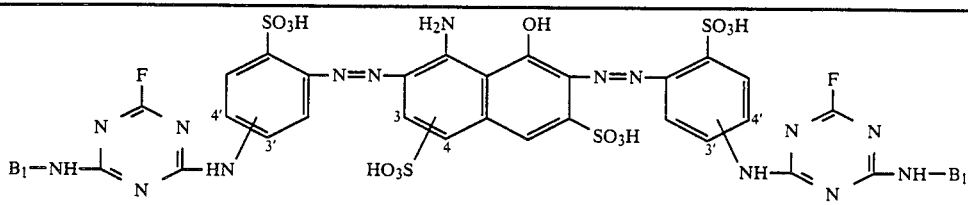

| Example | B₁ | Position of the NH group | Position of the SO₃H group | Shade on cotton |
|---|---|---|---|---|
| 31 | HO₃SOCH₂CH₂—O₂S—(2-methoxy-5-methylphenyl) | 3' | 3 | dark blue |
| 32 | " | 4' | 3 | dark blue |
| 33 | " | 3' | 4 | navy |
| 34 | " | 4' | 4 | black |
| 35 | HO₃SOCH₂CH₂—O₂S—(1-sulfo-2-methylnaphthyl) | 3' | 3 | navy |
| 36 | " | 4' | 3 | black |
| 37 | " | 3' | 4 | dark blue |
| 38 | " | 4' | 4 | black |
| 39 | HO₃SOCH₂CH₂—O₂S—(3-sulfo-7-methylnaphthyl) | 3' | 3 | dark blue |
| 40 | " | 4' | 3 | greenish black |
| 41 | " | 3' | 4 | navy |
| 42 | " | 4' | 4 | reddish navy |

EXAMPLES 43 TO 229

If one of the methods according to the invention for preparing the compounds according to the invention corresponding to the general formula (1), thus, for example, a method analogous to the method indicated in Example 1, was followed and for this purpose the starting materials used in the corresponding manner were 1,3- or 1,4-diaminobenzene derivatives or 1,5- or 2,6-diaminonaphthalene derivatives, cyanuric fluoride and an aniline or naphthylamine derivative having a β-sulfatoethylsulfonyl group, as condensation components—which can be read in the examples in the table below in conjunction with the general formula (A)—and were 1-amino-8-naphthol-3,6- or -4,6-disulfonic acid as coupling components, the disazo compounds according to the invention listed in the examples in the table were obtained, which had very good fastness properties and which likewise produced on natural and synthetic polyamide fiber materials, but particularly on natural and regenerated cellulose fiber materials, such as, in particular, cotton, in particular by the dyeing and printing and fixing methods customary for fiber-reactive dyestuffs, intensely colored dyeings and prints having very good fastness properties and the shades indicated in the examples in the table.

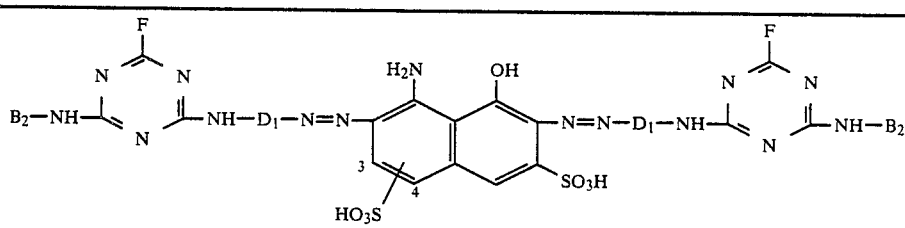

| Example | B₂ | D₁ | Position of HO₃S— | Shade on cotton |
|---|---|---|---|---|
| 43 | 4″-(β-sulfatoethyl-sulfonyl)-phenyl | 4',6'-disulfo-1',3'-phenylene | 3 | navy |
| 44 | " | 5'-sulfo-2'-methyl-1',3'-phenylene | 3 | navy |
| 45 | " | 4'-methyl-1',3'-phenylene | 3 | black |
| 46 | " | 4'-methoxy-1',3'-phenylene | 3 | black |
| 47 | " | 4',8'-disulfo-2',6'-naphthylene | 3 | navy |
| 48 | " | 3',7'-disulfo-1',5'-naphthylene | 3 | navy |

-continued

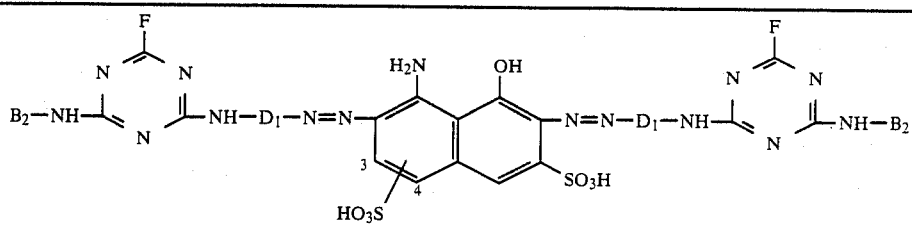
(B)

| Example | $B_2$ | $D_1$ | Position of $HO_3S-$ | Shade on cotton |
|---|---|---|---|---|
| 49 | " | p-phenylene | 3 | greenish black |
| 50 | " | m-phenylene | 3 | black |
| 51 | " | 4',6'-disulfo-1',3'-phenylene | 4 | navy |
| 52 | " | 5'-sulfo-2'-methyl-1',3'-phenylene | 4 | navy |
| 53 | " | 4'-methyl-1',3'-phenylene | 4 | black |
| 54 | " | 4'-methoxy-1',3'-phenylene | 4 | black |
| 55 | " | 4',8'-disulfo-2',6'-naphthylene | 4 | navy |
| 56 | " | 3',7'-disulfo-1',5'-naphthylene | 4 | navy |
| 57 | " | p-phenylene | 4 | greenish black |
| 58 | " | m-phenylene | 4 | black |
| 59 | " | 2',5'-disulfo-1',4'-phenylene | 4 | greenish black |
| 60 | 3''-(β-sulfatoethyl-sulfonyl)-phenyl | 4',6'-disulfo-1',3'-phenylene | 3 | navy |
| 61 | " | 5'-sulfo-2'-methyl-1',3'-phenylene | 3 | navy |
| 62 | " | 4'-methyl-1',3'-phenylene | 3 | black |
| 63 | " | 4'-methoxy-1',3'-phenylene | 3 | black |
| 64 | " | 4',8'-disulfo-2',6'-naphthylene | 3 | navy |
| 65 | " | 3',7'-disulfo-1',5'-naphthylene | 3 | navy |
| 66 | " | p-phenylene | 3 | greenish black |
| 67 | " | m-phenylene | 3 | black |
| 68 | " | 4',6'-disulfo-1',3'-phenylene | 4 | navy |
| 69 | " | 5'-sulfo-2'-methyl-1',3'-phenylene | 4 | navy |
| 70 | " | 4'-methyl-1',3'-phenylene | 4 | black |
| 71 | " | 4'-methoxy-1',3'-phenylene | 4 | black |
| 72 | " | 4',8'-disulfo-2',6'-naphthylene | 4 | navy |
| 73 | " | 3',7'-disulfo-1',5'-naphthylene | 4 | navy |
| 74 | " | p-phenylene | 4 | greenish black |
| 75 | " | m-phenylene | 4 | black |
| 76 | " | 2',5'-disulfo-1',4'-phenylene | 4 | greenish black |
| 77 | 2''-methoxy-5''-methyl-4''-(β-sulfatoethyl-sulfonyl)-phenyl | 4',6'-disulfo-1',3'-phenylene | 3 | navy |
| 78 | 2''-methoxy-5''-methyl-4''-(β-sulfatoethyl-sulfonyl)-phenyl | 5'-sulfo-2'-methyl-1',3'-phenylene | 3 | navy |
| 79 | 2''-methoxy-5''-methyl-4''-(β-sulfatoethyl-sulfonyl)-phenyl | 4'-methyl-1',3'-phenylene | 3 | navy |
| 80 | 2''-methoxy-5''-methyl-4''-(β-sulfatoethyl-sulfonyl)-phenyl | 4'-methoxy-1',3'-phenylene | 3 | black |
| 81 | 2''-methoxy-5''-methyl-4''-(β-sulfatoethyl-sulfonyl)-phenyl | 4',8'-disulfo-2',6'-naphthylene | 3 | navy |
| 82 | 2''-methoxy-5''-methyl-4''-(β-sulfatoethyl-sulfonyl)-phenyl | 3',7'-disulfo-1',5'-naphthylene | 3 | navy |
| 83 | 2''-methoxy-5''-methyl-4''-(β-sulfatoethyl-sulfonyl)-phenyl | p-phenylene | 3 | greenish black |
| 84 | 2''-methoxy-5''-methyl-4''-(β-sulfatoethyl-sulfonyl)-phenyl | m-phenylene | 3. | black |
| 85 | 2''-methoxy-5''-methyl-4''-(β-sulfatoethyl-sulfonyl)-phenyl | 4',6'-disulfo-1',3'-phenylene | 4 | navy |
| 86 | 2''-methoxy-5''-methyl-4''-(β-sulfatoethyl-sulfonyl)-phenyl | 5'-sulfo-2'-methyl-1',3'-phenylene | 4 | navy |
| 87 | 2''-methoxy-5''-methyl-4''-(β-sulfatoethyl-sulfonyl)-phenyl | 4'-methyl-1',3'-phenylene | 4 | black |
| 88 | 2''-methoxy-5''-methyl-4''-(β-sulfatoethyl-sulfonyl)-phenyl | 4'-methoxy-1',3'-phenylene | 4 | black |
| 89 | 2''-methoxy-5''-methyl-4''-(β-sulfatoethyl-sulfonyl)-phenyl | 4',8'-disulfo-2',6'-naphthylene | 4 | navy |
| 90 | 2''-methoxy-5''-methyl-4''-(β-sulfatoethyl-sulfonyl)-phenyl | 3',7'-disulfo-1',5'-naphthylene | 4 | navy |
| 91 | 2''-methoxy-5''-methyl-4''-(β-sulfatoethyl-sulfonyl)-phenyl | p-phenylene | 4 | greenish black |
| 92 | 2''-methoxy-5''-methyl-4''-(β-sulfatoethyl-sulfonyl)-phenyl | m-phenylene | 4 | black |
| 93 | 2''-methoxy-5''-methyl-4''-(β-sulfatoethyl-sulfonyl)-phenyl | 2',5'-disulfo-1',4'-phenylene | 4 | greenish black |
| 94 | 2'',5''-dimethoxy-4''-(β-sulfatoethyl-sulfonyl)-phenyl | 4',6'-disulfo-1',3'-phenylene | 3 | navy |
| 95 | 2'',5''-dimethoxy-4''-(β-sulfatoethyl-sulfonyl)-phenyl | 5'-sulfo-2'-methyl-1',3'-phenylene | 3 | navy |
| 96 | 2'',5''-dimethoxy-4''-(β-sulfatoethyl-sulfonyl)-phenyl | 4'-methyl-1',3'-phenylene | 3 | black |
| 97 | 2'',5''-dimethoxy-4''-(β-sulfatoethyl-sulfonyl)-phenyl | 4'-methoxy-1',3'-phenylene | 3 | black |

-continued

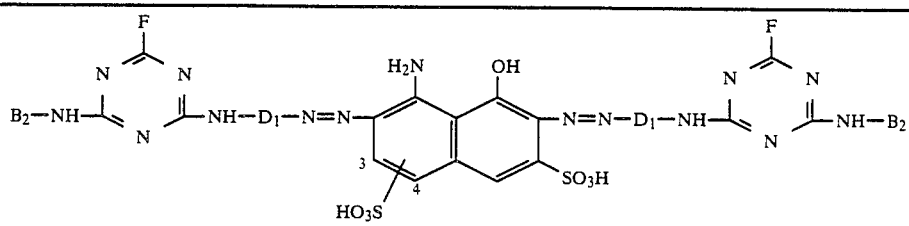

(B)

| Example | B₂ | D₁ | Position of HO₃S— | Shade on cotton |
|---|---|---|---|---|
| 98 | 2",5"-dimethoxy-4"-(β-sulfatoethyl-sulfonyl)-phenyl | 4',8'-disulfo-2',6'-naphthylene | 3 | navy |
| 99 | 2",5"-dimethoxy-4"-(β-sulfatoethyl-sulfonyl)-phenyl | 3',7'-disulfo-1',5'-naphthylene | 3 | navy |
| 100 | 2",5"-dimethoxy-4"-(β-sulfatoethyl-sulfonyl)-phenyl | p-phenylene | 3 | greenish black |
| 101 | 2",5"-dimethoxy-4"-(β-sulfatoethyl-sulfonyl)-phenyl | m-phenylene | 3 | black |
| 102 | 2",5"-dimethoxy-4"-(β-sulfatoethyl-sulfonyl)-phenyl | 4',6'-disulfo-1',3'-phenylene | 4 | navy |
| 103 | 2",5"-dimethoxy-4"-(β-sulfatoethyl-sulfonyl)-phenyl | 5'-sulfo-2'-methyl-1',3'-phenylene | 4 | navy |
| 104 | 2",5"-dimethoxy-4"-(β-sulfatoethyl-sulfonyl)-phenyl | 4'-methyl-1',3'-phenylene | 4 | black |
| 105 | 2",5"-dimethoxy-4"-(β-sulfatoethyl-sulfonyl)-phenyl | 4'-methoxy-1',3'-phenylene | 4 | black |
| 106 | 2",5"-dimethoxy-4"-(β-sulfatoethyl-sulfonyl)-phenyl | 4',8'-disulfo-2',6'-naphthylene | 4 | navy |
| 107 | 2",5"-dimethoxy-4"-(β-sulfatoethyl-sulfonyl)-phenyl | 3',7'-disulfo-1',5'-naphthylene | 4 | navy |
| 108 | 2",5"-dimethoxy-4"-(β-sulfatoethyl-sulfonyl)-phenyl | p-phenylene | 4 | greenish black |
| 109 | 2",5"-dimethoxy-4"-(β-sulfatoethyl-sulfonyl)-phenyl | m-phenylene | 4 | black |
| 110 | 2",5"-dimethoxy-4"-(β-sulfatoethyl-sulfonyl)-phenyl | 2',5'-disulfo-1',4'-phenylene | 4 | greenish black |
| 111 | 4"-N—methyl-N—(β-sulfato-ethyl-sulfonyl)-phenyl | 4',6'-disulfo-1',3'-phenylene | 3 | navy |
| 112 | 4"-N—methyl-N—(β-sulfato-ethyl-sulfonyl)-phenyl | 5'-sulfo-2'-methyl-1',3'-phenylene | 3 | navy |
| 113 | 4"-N—methyl-N—(β-sulfato-ethyl-sulfonyl)-phenyl | 4'-methyl-1',3'-phenylene | 3 | black |
| 114 | 4"-N—methyl-N—(β-sulfato-ethyl-sulfonyl)-phenyl | 4'-methoxy-1',3'-phenylene | 3 | black |
| 115 | 4"-N—methyl-N—(β-sulfato-ethyl-sulfonyl)-phenyl | 4',8'-disulfo-2',6'-naphthylene | 3 | navy |
| 116 | 4"-N—methyl-N—(β-sulfato-ethyl-sulfonyl)-phenyl | 3',7'-disulfo-1',5'-naphthylene | 3 | navy |
| 117 | 4"-N—methyl-N—(β-sulfato-ethyl-sulfonyl)-phenyl | p-phenylene | 3 | greenish black |
| 118 | 4"-N—methyl-N—(β-sulfato-ethyl-sulfonyl)-phenyl | m-phenylene | 3 | black |
| 119 | 4"-N—methyl-N—(β-sulfato-ethyl-sulfonyl)-phenyl | 4',6'-disulfo-1',3'-phenylene | 4 | navy |
| 120 | 4"-N—methyl-N—(β-sulfato-ethyl-sulfonyl)-phenyl | 5'-sulfo-2'-methyl-1',3'-phenylene | 4 | navy |
| 121 | 4"-N—methyl-N—(β-sulfato-ethyl-sulfonyl)-phenyl | 4'-methyl-1',3'-phenylene | 4 | black |
| 122 | 4"-N—methyl-N—(β-sulfato-ethyl-sulfonyl)-phenyl | 4'-methoxy-1',3'-phenylene | 4 | black |
| 123 | 4"-N—methyl-N—(β-sulfato-ethyl-sulfonyl)-phenyl | 4',8'-disulfo-2',6'-naphthylene | 4 | navy |
| 124 | 4"-N—methyl-N—(β-sulfato-ethyl-sulfonyl)-phenyl | 3',7'-disulfo-1',5'-naphthylene | 4 | navy |
| 125 | 4"-N—methyl-N—(β-sulfato-ethyl-sulfonyl)-phenyl | p-phenylene | 4 | greenish black |
| 126 | 4"-N—methyl-N—(β-sulfato-ethyl-sulfonyl)-phenyl | m-phenylene | 4 | black |
| 127 | 4"-N—methyl-N—(β-sulfato-ethyl-sulfonyl)-phenyl | 2',5'-disulfo-1',4'-phenylene | 4 | greenish black |
| 128 | 3"-(β-sulfatoethyl-sulfonyl-methyl)-phenyl | 4',6'-disulfo-1',3'-phenylene | 3 | navy |
| 129 | 3"-(β-sulfatoethyl-sulfonyl-methyl)-phenyl | 5'-sulfo-2'-methyl-1',3'-phenylene | 3 | navy |
| 130 | 3"-(β-sulfatoethyl-sulfonyl-methyl)-phenyl | 4'-methyl-1',3'-phenylene | 3 | black |
| 131 | 3"-(β-sulfatoethyl-sulfonyl-methyl)-phenyl | 4'-methoxy-1',3'-phenylene | 3 | black |
| 132 | 3"-(β-sulfatoethyl-sulfonyl-methyl)-phenyl | 4',8'-disulfo-2',6'-naphthylene | 3 | navy |

-continued

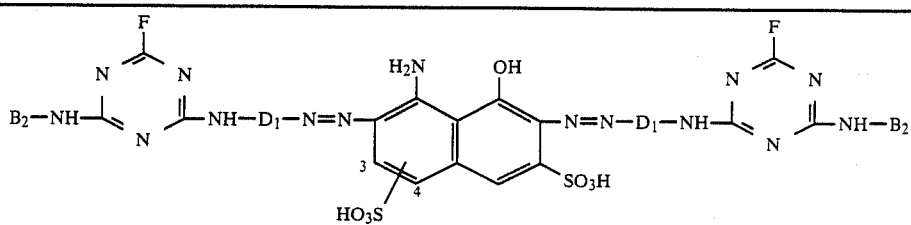

| Example | B₂ | D₁ | Position of HO₃S— | Shade on cotton |
|---|---|---|---|---|
| 133 | 3''-(β-sulfatoethyl-sulfonyl-methyl)-phenyl | 3',7'-disulfo-1',5'-naphthylene | 3 | navy |
| 134 | 3''-(β-sulfatoethyl-sulfonyl-methyl)-phenyl | p-phenylene | 3 | greenish black |
| 135 | 3''-(β-sulfatoethyl-sulfonyl-methyl)-phenyl | m-phenylene | 3 | black |
| 136 | 3''-(β-sulfatoethyl-sulfonyl-methyl)-phenyl | 4',6'-disulfo-1',3'-phenylene | 4 | navy |
| 137 | 3''-(β-sulfatoethyl-sulfonyl-methyl)-phenyl | 5'-sulfo-2'-methyl-1',3'-phenylene | 4 | navy |
| 138 | 3''-(β-sulfatoethyl-sulfonyl-methyl)-phenyl | 4'-methyl-1',3'-phenylene | 4 | black |
| 139 | 3''-(β-sulfatoethyl-sulfonyl-methyl)-phenyl | 4'-methoxy-1',3'-phenylene | 4 | black |
| 140 | 3''-(β-sulfatoethyl-sulfonyl-methyl)-phenyl | 4',8'-disulfo-2',6'-naphthylene | 4 | navy |
| 141 | 3''-(β-sulfatoethyl-sulfonyl-methyl)-phenyl | 3',7'-disulfo-1',5'-naphthylene | 4 | navy |
| 142 | 3''-(β-sulfatoethyl-sulfonyl-methyl)-phenyl | p-phenylene | 4 | greenish black |
| 143 | 3''-(β-sulfatoethyl-sulfonyl-methyl)-phenyl | m-phenylene | 4 | black |
| 144 | 3''-(β-sulfatoethyl-sulfonyl-methyl)-phenyl | 2',5'-disulfo-1',4'-phenylene | 4 | greenish black |
| 145 | 6''-methyl-3''-(β-sulfatoethyl-sulfonyl)-phenyl | 4',6'-disulfo-1',3'-phenylene | 3 | navy |
| 146 | 6''-methyl-3''-(β-sulfatoethyl-sulfonyl)-phenyl | 5'-sulfo-2'-methyl-1',3'-phenylene | 3 | navy |
| 147 | 6''-methyl-3''-(β-sulfatoethyl-sulfonyl)-phenyl | 4'-methyl-1',3'-phenylene | 3 | black |
| 148 | 6''-methyl-3''-(β-sulfatoethyl-sulfonyl)-phenyl | 4'-methxoy-1',3'-phenylene | 3 | black |
| 149 | 6''-methyl-3''-(β-sulfatoethyl-sulfonyl)-phenyl | 4',8'-disulfo-2',6'-naphthylene | 3 | navy |
| 150 | 6''-methyl-3''-(β-sulfatoethyl-sulfonyl)-phenyl | 3',7'-disulfo-1',5'-naphthylene | 3 | navy |
| 151 | 6''-methyl-3''-(β-sulfatoethyl-sulfonyl)-phenyl | p-phenylene | 3 | greenish black |
| 152 | 6''-methyl-3''-(β-sulfatoethyl-sulfonyl)-phenyl | m-phenylene | 3 | black |
| 153 | 6''-methyl-3''-(β-sulfatoethyl-sulfonyl)-phenyl | 4',6'-disulfo-1',3'-phenylene | 4 | navy |
| 154 | 6''-methyl-3''-(β-sulfatoethyl-sulfonyl)-phenyl | 5'-sulfo-2'-methyl-1',3'-phenylene | 4 | navy |
| 155 | 6''-methyl-3''-(β-sulfatoethyl-sulfonyl)-phenyl | 4'-methyl-1',3'-phenylene | 4 | black |
| 156 | 6''-methyl-3''-(β-sulfatoethyl-sulfonyl)-phenyl | 4'-methoxy-1',3'-phenylene | 4 | black |
| 157 | 6''-methyl-3''-(β-sulfatoethyl-sulfonyl)-phenyl | 4',8'-disulfo-2',6'-naphthylene | 4 | navy |
| 158 | 6''-methyl-3''-(β-sulfatoethyl-sulfonyl)-phenyl | 3',7'-disulfo-1',5'-naphthylene | 4 | navy |
| 159 | 6''-methyl-3''-(β-sulfatoethyl-sulfonyl)-phenyl | p-phenylene | 4 | greenish black |
| 160 | 6''-methyl-3''-(β-sulfatoethyl-sulfonyl)-phenyl | m-phenylene | 4 | black |
| 161 | 6''-methyl-3''-(β-sulfatoethyl-sulfonyl)-phenyl | 2',5'-disulfo-1',4'-phenylene | 4 | greenish black |
| 162 | 4'',6''-dimethoxy-3''-(β-sulfatoethyl-sulfonyl)-phenyl | 4',6'-disulfo-1',3'-phenylene | 3 | navy |
| 163 | 4'',6''-dimethoxy-3''-(β-sulfatoethyl-sulfonyl)-phenyl | 5'-sulfo-2'-methyl-1',3'-phenylene | 3 | navy |
| 164 | 4'',6''-dimethoxy-3''-(β-sulfatoethyl-sulfonyl)-phenyl | 4'-methyl-1',3'-phenylene | 3 | black |
| 165 | 4'',6''-dimethoxy-3''-(β-sulfatoethyl-sulfonyl)-phenyl | 4'-methoxy-1',3'-phenylene | 3 | black |
| 166 | 4'',6''-dimethoxy-3''-(β-sulfatoethyl-sulfonyl)-phenyl | 4',8'-disulfo-2',6'-naphthylene | 3 | navy |
| 167 | 4'',6''-dimethoxy-3''-(β-sulfatoethyl-sulfonyl)-phenyl | 3',7'-disulfo-1',5'-naphthylene | 3 | navy |

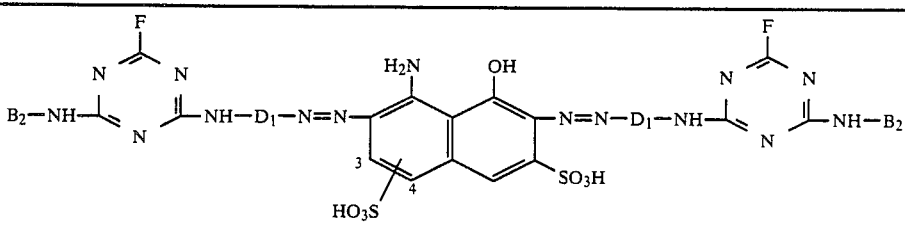

(B)

| Example | B₂ | D₁ | Position of HO₃S— | Shade on cotton |
|---|---|---|---|---|
| 168 | 4″,6″-dimethoxy-3″-(β-sulfatoethyl-sulfonyl)-phenyl | p-phenylene | 3 | greenish black |
| 169 | 4″,6″-dimethoxy-3″-(β-sulfatoethyl-sulfonyl)-phenyl | m-phenylene | 3 | black |
| 170 | 4″,6″-dimethoxy-3″-(β-sulfatoethyl-sulfonyl)-phenyl | 4′,6′-disulfo-1′,3′-phenylene | 4 | navy |
| 171 | 4″,6″-dimethoxy-3″-(β-sulfatoethyl-sulfonyl)-phenyl | 5′-sulfo-2′-methyl-1′,3′-phenylene | 4 | navy |
| 172 | 4″,6″-dimethoxy-3″-(β-sulfatoethyl-sulfonyl)-phenyl | 4′-methyl-1′,3′-phenylene | 4 | black |
| 173 | 4″,6″-dimethoxy-3″-(β-sulfatoethyl-sulfonyl)-phenyl | 4′-methoxy-1′,3′-phenylene | 4 | black |
| 174 | 4″,6″-dimethoxy-3″-(β-sulfatoethyl-sulfonyl)-phenyl | 4′,8′-disulfo-2′,6′-naphthylene | 4 | navy |
| 175 | 4″,6″-dimethoxy-3″-(β-sulfatoethyl-sulfonyl)-phenyl | 3′,7′-disulfo-1′,5′-naphthylene | 4 | navy |
| 176 | 4″,6″-dimethoxy-3″-(β-sulfatoethyl-sulfonyl)-phenyl | p-phenylene | 4 | greenish black |
| 177 | 4″,6″-dimethoxy-3″-(β-sulfatoethyl-sulfonyl)-phenyl | m-phenylene | 4 | black |
| 178 | 4″,6″-dimethoxy-3″-(β-sulfatoethyl-sulfonyl)-phenyl | 2′,5′-disulfo-1′,4′-phenylene | 4 | greenish black |
| 179 | 4″-methoxy-3″-(β-sulfatoethyl-sulfonyl)-phenyl | 4′,6′-disulfo-1′,3′-phenylene | 3 | navy |
| 180 | 4″-methoxy-3″-(β-sulfatoethyl-sulfonyl)-phenyl | 5′-sulfo-2′-methyl-1′,3′-phenylene | 3 | navy |
| 181 | 4″-methoxy-3″-(β-sulfatoethyl-sulfonyl)-phenyl | 4′-methyl-1′,3′-phenylene | 3 | black |
| 182 | 4″-methoxy-3″-(β-sulfatoethyl-sulfonyl)-phenyl | 4′-methoxy-1′,3′-phenylene | 3 | black |
| 183 | 4″-methoxy-3″-(β-sulfatoethyl-sulfonyl)-phenyl | 4′,8′-disulfo-2′,6′-naphthylene | 3 | navy |
| 184 | 4″-methoxy-3″-(β-sulfatoethyl-sulfonyl)-phenyl | 3′,7′-disulfo-1′,5′-naphthylene | 3 | navy |
| 185 | 4″-methoxy-3″-(β-sulfatoethyl-sulfonyl)-phenyl | p-phenylene | 3 | greenish black |
| 186 | 4″-methoxy-3″-(β-sulfatoethyl-sulfonyl)-phenyl | m-phenylene | 3 | black |
| 187 | 4″-methoxy-3″-(β-sulfatoethyl-sulfonyl)-phenyl | 4′,6′-disulfo-1′,3′-phenylene | 4 | navy |
| 188 | 4″-methoxy-3″-(β-sulfatoethyl-sulfonyl)-phenyl | 5′-sulfo-2′-methyl-1′,3′-phenylene | 4 | navy |
| 189 | 4″-methoxy-3″-(β-sulfatoethyl-sulfonyl)-phenyl | 4′-methyl-1′,3′-phenylene | 4 | black |
| 190 | 4″-methoxy-3″-(β-sulfatoethyl-sulfonyl)-phenyl | 4′-methoxy-1′,3′-phenylene | 4 | black |
| 191 | 4″-methoxy-3″-(β-sulfatoethyl-sulfonyl)-phenyl | 4′,8′-disulfo-2′,6′-naphthylene | 4 | navy |
| 192 | 4″-methoxy-3″-(β-sulfatoethyl-sulfonyl)-phenyl | 3′,7′-disulfo-1′,5′-naphthylene | 4 | navy |
| 193 | 4″-methoxy-3″-(β-sulfatoethyl-sulfonyl)-phenyl | p-phenylene | 4 | greenish black |
| 194 | 4″-methoxy-3″-(β-sulfatoethyl-sulfonyl)-phenyl | m-phenylene | 4 | black |
| 195 | 4″-methoxy-3″-(β-sulfatoethyl-sulfonyl)-phenyl | 2′,5′-disulfo-1′,4′-phenylene | 4 | greenish black |
| 196 | 1″-sulfo-6″-(β-sulfatoethyl-sulfonyl)-2″-naphthyl | 4′,6′-disulfo-1′,3′-phenylene | 3 | navy |
| 197 | 1″-sulfo-6″-(β-sulfatoethyl-sulfonyl)-2″-naphthyl | 5′-sulfo-2′-methyl-1′,3′-phenylene | 3 | navy |
| 198 | 1″-sulfo-6″-(β-sulfatoethyl-sulfonyl)-2″-naphthyl | 4′-methyl-1′,3′-phenylene | 3 | black |
| 199 | 1″-sulfo-6″-(β-sulfatoethyl-sulfonyl)-2″-naphthyl | 4′-methoxy-1′,3′-phenylene | 3 | black |
| 200 | 1″-sulfo-6″-(β-sulfatoethyl-sulfonyl)-2″-naphthyl | 4′,8′-disulfo-2′,6′-naphthylene | 3 | navy |
| 201 | 1″-sulfo-6″-(β-sulfatoethyl-sulfonyl)-2″-naphthyl | 3′,7′-disulfo-1′,5′-naphthylene | 3 | navy |
| 202 | 1″-sulfo-6″-(β-sulfatoethyl-sulfonyl)-2″-naphthyl | p-phenylene | 3 | greenish black |

-continued $$\text{(B)}$$

Structure B: A naphthalene core with H₂N and OH groups, flanked on both sides by —N=N—D₁—NH—C(=N)—NH—B₂ groups bearing fluorotriazine moieties (F on triazine ring with two N), with HO₃S and SO₃H substituents on the naphthalene (positions 3 and 4 indicated).

| Example | B₂ | D₁ | Position of HO₃S— | Shade on cotton |
|---|---|---|---|---|
| 203 | 1″-sulfo-6″-(β-sulfatoethylsulfonyl)-2″-naphthyl | m-phenylene | 3 | black |
| 204 | 1″-sulfo-6″-(β-sulfatoethylsulfonyl)-2″-naphthyl | 4′,6′-disulfo-1′,3′-phenylene | 4 | navy |
| 205 | 1″-sulfo-6″-(β-sulfatoethylsulfonyl)-2″-naphthyl | 5′-sulfo-2′-methyl-1′,3′-phenylene | 4 | navy |
| 206 | 1″-sulfo-6″-(β-sulfatoethylsulfonyl)-2″-naphthyl | 4′-methyl-1′,3′-phenylene | 4 | black |
| 207 | 1″-sulfo-6″-(β-sulfatoethylsulfonyl)-2″-naphthyl | 4′-methoxy-1′,3′-phenylene | 4 | black |
| 208 | 1″-sulfo-6″-(β-sulfatoethylsulfonyl)-2″-naphthyl | 4′,8′-disulfo-2′,6′-naphthylene | 4 | navy |
| 209 | 1″-sulfo-6″-(β-sulfatoethylsulfonyl)-2″-naphthyl | 3′,7′-disulfo-1′,5′-naphthylene | 4 | navy |
| 210 | 1″-sulfo-6″-(β-sulfatoethylsulfonyl)-2″-naphthyl | p-phenylene | 4 | greenish black |
| 211 | 1″-sulfo-6″-(β-sulfatoethylsulfonyl)-2″-naphthyl | m-phenylene | 4 | black |
| 212 | 1″-sulfo-6″-(β-sulfatoethylsulfonyl)-2″-naphthyl | 2′,5′-disulfo-1′,4′-phenylene | 4 | greenish black |
| 213 | 6″-sulfo-8″-(β-sulfatoethylsulfonyl)-2″-naphthyl | 4′,6′-disulfo-1′,3′-phenylene | 3 | navy |
| 214 | 6″-sulfo-8″-(β-sulfatoethylsulfonyl)-2″-naphthyl | 5′-sulfo-2′-methyl-1′,3′-phenylene | 3 | navy |
| 215 | 6″-sulfo-8″-(β-sulfatoethylsulfonyl)-2″-naphthyl | 4′-methyl-1′,3′-phenylene | 3 | black |
| 216 | 6″-sulfo-8″-(β-sulfatoethylsulfonyl)-2″-naphthyl | 4′-methoxy-1′,3′-phenylene | 3 | black |
| 217 | 6″-sulfo-8″-(β-sulfatoethylsulfonyl)-2″-naphthyl | 4′,8′-disulfo-2′,6′-naphthylene | 3 | navy |
| 218 | 6″-sulfo-8″-(β-sulfatoethylsulfonyl)-2″-naphthyl | 3′,7′-disulfo-1′,5′-naphthylene | 3 | navy |
| 219 | 6″-sulfo-8″-(β-sulfatoethylsulfonyl)-2″-naphthyl | p-phenylene | 3 | greenish black |
| 220 | 6″-sulfo-8″-(β-sulfatoethylsulfonyl)-2″-naphthyl | m-phenylene | 3 | black |
| 221 | 6″-sulfo-8″-(β-sulfatoethylsulfonyl)-2″-naphthyl | 4′,6′-disulfo-1′,3′-phenylene | 4 | navy |
| 222 | 6″-sulfo-8″-(β-sulfatoethylsulfonyl)-2″-naphthyl | 5′-sulfo-2′-methyl-1′,3′-phenylene | 4 | navy |
| 223 | 6″-sulfo-8″-(β-sulfatoethylsulfonyl)-2″-naphthyl | 4′-methyl-1′,3′-phenylene | 4 | black |
| 224 | 6″-sulfo-8″-(β-sulfatoethylsulfonyl)-2″-naphthyl | 4′-methoxy-1′,3′-phenylene | 4 | black |
| 225 | 6″-sulfo-8″-(β-sulfatoethylsulfonyl)-2″-naphthyl | 4′,8′-disulfo-2′,6′-naphthylene | 4 | navy |
| 226 | 6″-sulfo-8″-(β-sulfatoethylsulfonyl)-2″-naphthyl | 3′,7′-disulfo-1′,5′-naphthylene | 4 | navy |
| 227 | 6″-sulfo-8″-(β-sulfatoethylsulfonyl)-2″-naphthyl | p-phenylene | 4 | greenish black |
| 228 | 6″-sulfo-8″-(β-sulfatoethylsulfonyl)-2″-naphthyl | m-phenylene | 4 | black |
| 229 | 6″-sulfo-8″-(β-sulfatoethylsulfonyl)-2″-naphthyl | 2′,5′-disulfo-1′,4′-phenylene | 4 | greenish black |

EXAMPLE 230

13.7 parts of cyanuric fluoride were added dropwise in the course of 15 minutes at 0°–3° C. to a neutral solution of 28.1 parts of aniline-4-β-sulfatoethyl sulfone in 100 parts of water, and aqueous sodium hydroxide was added to maintain the pH at the value of about 6.0. A neutral solution of 26.8 parts by weight of 1,4-diaminobenzene-2,5-disulfonic acid in 200 parts of water was then added to the resulting reaction mixture, and the mixture thus obtained was stirred at 18°–20° C. and at a pH value of about 6.0 to 7.0 for a few hours, during which period the pH value was maintained within the indicated range by addition, in portions, of aqueous sodium hydroxide. The reaction product formed was then in the form of a clear solution.

250 parts of ice and 60 parts by volume of a 31% strength aqueous hydrochloric acid were added to this solution; the subsequent diazotization was effected by the dropwise addition of 20 parts by volume of aqueous 5N sodium nitrite solution at a temperature of 0° to 5° C. The resulting diazonium salt solution was then added dropwise at a pH value of 2.5 to 3.0 and at a temperature of 0° to 10° C. to a solution of 31.9 parts of 1-amino-8-naphthol-3,6-disulfonic acid in 1,500 parts of water, during which addition the pH was maintained within the indicated range by addition, in portions, of 63 parts of crystalline sodium acetate. After the coupling was complete, the monoazo compound formed was precipitated by means of potassium chloride and filtered off with suction.

The moist filter cake of the monoazo compound was dissolved in 500 parts of water, and a diazonium salt solution, prepared as indicated below, was added to this solution:

13.7 parts of cyanuric fluoride were added dropwise in the course of 15 minutes at 0°-2° C. to a neutral solution of 34.1 parts of 2,5l-dimethoxyaniline-4-β-sulfatoethyl sulfone in a mixture of 140 parts of water and 60 parts of ice, during which addition the pH was maintained at a value of about 6.0 by adding aqueous sodium hydroxide. A neutral solution of 18.8 parts by weight of 1,4-diaminobenzene-2-sulfonic acid in 200 parts of water was then added to the resulting reaction mixture, and the mixture thus obtained was stirred for a few hours at 18°-20° C. and at a pH value of 6.2 to 6.8, during which period the pH value was maintained within the range indicated by the addition, in portions, of aqueous sodium hydroxide. 40 parts by volume of a 31% strength aqueous hydrochloric acid were then added to the resulting solution of the secondary condensation product, the mixture was cooled down to 0°-5° C. and diazotized by means of 20 parts by volume of an aqueous 5N sodium nitrite solution. The pH of this diazonium salt solution was adjusted by means of sodium bicarbonate to a value of 5.5 to 5.8, and the solution, as mentioned above, was added to the solution of the monoazo compound.

This second coupling reaction was carried out at a pH value of 5.5 to 6.5 and at a temperature of 23° to 25° C. This disazo compound formed was precipitated by means of potassium chloride, filtered off with suction, dried and ground. A black powder was obtained which contained electrolyte, predominantly potassium chloride, and to an extent of about 48% alkali metal salt, predominantly the potassium salt, of the compound of the formula

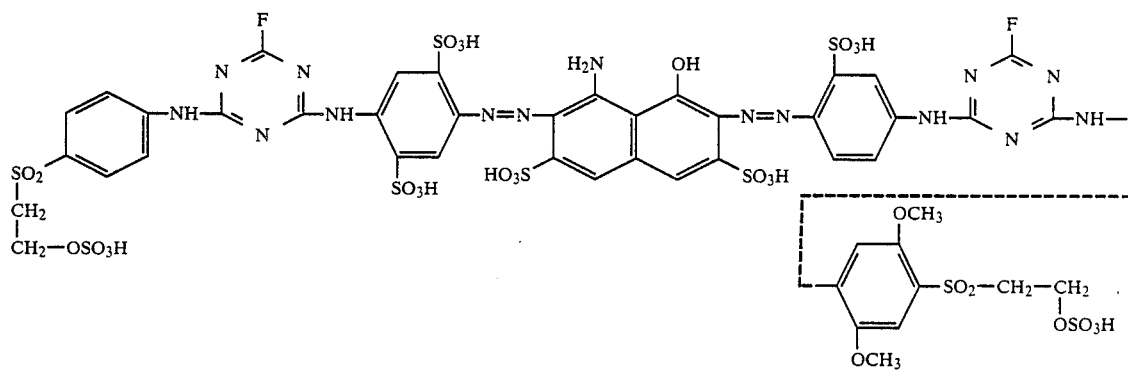

This compound had very good dyestuff properties and produced, using the application and fixing methods customary for fiber-reactive dyestuffs, dyeings and prints on cellulose fiber materials with a greenish black shade having very good end-use and manufacturing fastness properties, such as, in particular, very good wash fastness and fastness to perspiration, water, seawater, acids and alkalis, and also very good rubbing and pleating fastness properties.

EXAMPLES 231 TO 237

The method according to the invention for preparing the compounds of the general formula (1) according to the invention was used analogously to the information given in Example 230, but, instead of the reaction components given there, the starting components which can be seen in the examples in the following table in conjunction with the general formula (C) (aniline derivatives having the β-sulfatoethylsulfonyl group, cyanuric fluoride and a diaminobenzenemonosulfonic or diaminobenzenedisulfonic acid for the two secondary condensation products which serve as diazo components, and 1-amino-8-naphthol-3,6-disulfonic acid or 1-amino-8-naphthol-4,6-disulfonic acid as the coupling component) were used. The disazo compounds according to the invention which are mentioned in these examples in the table with reference to the general formula (C) were obtained which had very good dyestuff properties and produced, by the application and fixing methods customary in industry for fiber-reactive dyestuffs, dyeings and prints having good fastness properties and the shades given in the examples in the table.

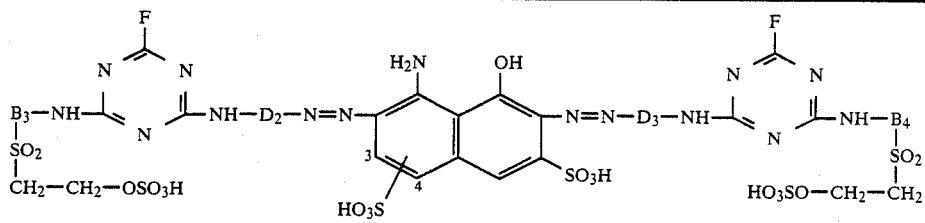
(C)

| Example | B₃ | B₄ | D₂ | D₃ | Position of HO₃S— | Shade on cotton |
|---|---|---|---|---|---|---|
| 231 | phenyl | phenyl | 2-SO₃H-phenyl | 4-HO₃S-phenyl | 3 | greenish black |
| 232 | phenyl | 3-CH₃-phenyl | 2-SO₃H-phenyl | 4-HO₃S-phenyl | 3 | greenish navy |
| 233 | phenyl | 3-CH₃O-phenyl | 4-SO₃H-phenyl | 4-HO₃S-phenyl | 3 | navy |
| 234 | phenyl | phenyl | 2-SO₃H-phenyl | 4-HO₃S-phenyl | 3 | navy |
| 235 | phenyl | phenyl | 4-SO₃H-phenyl | 2,5-(HO₃S)₂-phenyl | 4 | dark blue |
| 236 | phenyl | phenyl | 2-SO₃H-phenyl | 2,5-(HO₃S)₂-phenyl | 4 | dark blue |
| 237 | 4-CH₃-phenyl | 3-CH₃O-phenyl | 4-SO₃H-phenyl | 2-HO₃S-5-methyl-phenyl | 3 | navy |

EXAMPLE 238

The method given in Example 1 was used, but aniline-4-β-sulfatoethyl sulfone was replaced in each case by the equivalent amount (29.7 parts) of aniline-4-β-thiosulfatoethyl sulfone. An electrolyte-containing dyestuff powder was obtained which contained the alkali metal salt of the compound of the formula

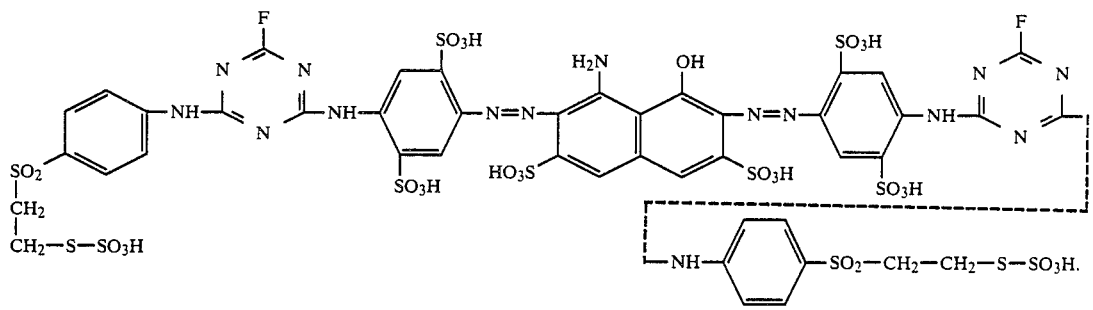

This disazo compound was also a very good dyestuff which in comparison with the dyestuff of Example 1 had similarly good coloristic and fastness properties. It was possible to use this compound on natural and synthetic polyamide fiber materials, but in particular on natural and regenerated cellulose fiber materials, such as preferably cotton, according to the application and fixing methods customary in particular for fiber-reactive dyestuffs.

EXAMPLE 239

The monoazo compound was prepared according to the information of Example 1 and dissolved in 500 parts of water. The second coupling reaction was carried out with another diazonium compound which was prepared as follows: 13.7 parts of cyanuric fluoride were added dropwise in the course of 10 to 20 minutes at 0° C. to a solution of 17.3 parts of aniline-3-sulfonic acid in 100 parts of water and 50 parts of a 2N sodium hydroxide solution, during which addition the pH value was maintained at about 6.0 by adding aqueous sodium hydroxide. A neutral solution of 18.8 parts of 1,4-diaminobenzene-2-sulfonic acid in 200 parts of water was then added, and the second condensation reaction was allowed to proceed at a pH value of 6.0 to 7.0 and at a temperature of 18° to 20° C. while stirring for several hours. After the condensation was complete, the solution was clarified and acidified by means of 35 parts by volumne of a 31% strength aqueous hydrochloric acid, 500 parts of ice were added, and diazotization was carried out by the slow addition of 20 parts by volume of an aqueous 5N sodium nitrite solution. As customary, excess nitrous acid was then destroyed with a small amount of amidosulfonic acid. The diazonium salt suspension was then adjusted with 17.8 parts of sodium bicarbonate to a pH value of 5.5 to 6.5 and, as mentioned above, coupled with the solution of the monoazo compound at a pH value of 5.5 to 6.5. The disazo compound formed was salted out with potassium chloride, filtered off with suction and dried. A black dyestuff powder was obtained which contained electrolyte, predominantly potassium chloride, and to an extent of about 40 to 45% alkali metal salt, predominantly potassium salt, of the compound of the formula

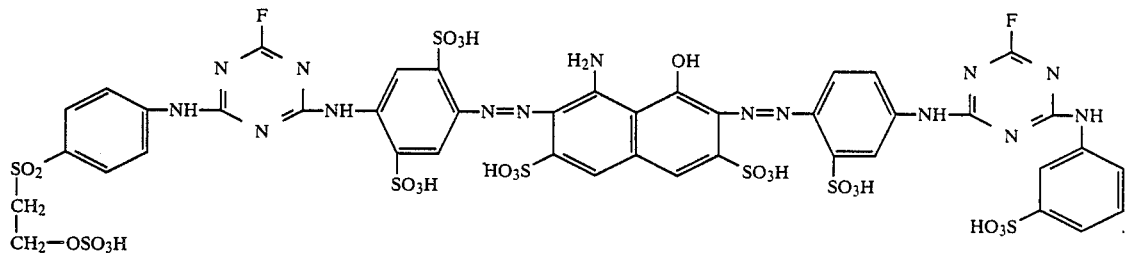

This compound had very good dyestuff properties and produced, by the application and fixing methods customary for fiber-reactive dyestuffs, on cellulose fiber materials, such as cotton, greenish black dyeings and prints having very good end-use and manufacturing fastness properties, such as, for example, very good fastness to washing, perspiration, rubbing, acids and alkalis.

EXAMPLES 240 TO 255

For preparing the novel compounds of the general formula (1), the method according to the invention was used analogously to the information given in Example 239, but, instead of the reaction components given there, the starting components which can be seen in the examples in the following table in conjunction with the general formulae (D) and (E) (aniline derivatives having a β-sulfatoethylsulfonyl group or not, cyanuric fluoride and a diaminobenzene compound for the two secondary condensation products which serve as the diazo component, and 1-amino-8-naphthol-3,6- or -4,6-disulfonic acid as the coupling component) were used; the disazo compounds according to the invention mentioned in the examples in the table with reference to the general formulae (D) and (E) were obtained which had very good dyestuff properties and produced, by the application and fixing methods customary in industry for fiber-reactive dyestuffs, dyeings and prints having good fastness properties and the shades given in the examples in the table.

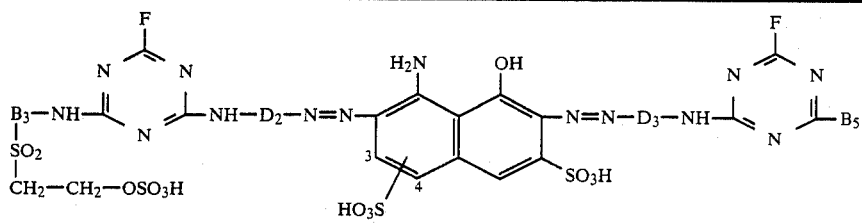

(D)

| Example | B₃ | D₂ | D₃ | B₅ | Position of HO₃S— | Shade on cotton |
|---|---|---|---|---|---|---|
| 240 | –⌬– | –C₆H₃(SO₃H)– | –C₆H₃(SO₃H)– (1,4 with SO₃H) | –NH–C₆H₄–SO₃H | 3 | greenish black |
| 241 | –⌬– | " | " | –N(CH₃)–C₆H₅ | 3 | greenish black |
| 242 | –⌬– | " | –C₆H₃(SO₃H)– | –N(CH₃)–CH₂–CH₂–SO₃H | 3 | greenish navy |
| 243 | –⌬– | –C₆H₃(SO₃H)₂– | " | –NH₂ | 3 | black |
| 244 | –C₆H₃(OCH₃)– | –C₆H₃(SO₃H)– | –C₆H₃(SO₃H)– (HO₃S-) | –N(C₂H₅)₂ | 3 | reddish navy |
| 245 | –⌬– | –C₆H₃(SO₃H)₂– | –C₆H₃(Cl)– | –N(CH₃)–CH₂–CH₂–OH | 3 | dark blue |
| 246 | –⌬– | –C₆H₃(CH₃)– | –C₆H₃(SO₃H)₂– | –HN–CH₂–CH₂–COOH | 4 | navy |
| 247 | –⌬– | –C₆H₄–SO₃H | –C₆H₃(SO₃H)– | –NH–C₆H₄–SO₃H | 3 | black |

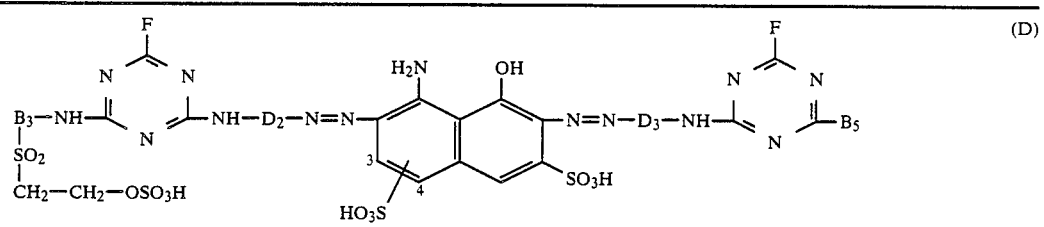
(D)

| Example | $B_3$ | $D_2$ | $D_3$ | $B_5$ | Position of $HO_3S-$ | Shade on cotton |
|---|---|---|---|---|---|---|
| 247a | –⟨ ⟩– | –⟨ ⟩– with $SO_3H$, $SO_3H$ | –⟨ ⟩– with $SO_3H$ | –NH–⟨ ⟩–Cl | 3 | black |
| 247b | " | " | " | –NH–⟨ ⟩–OCH$_3$ | 3 | black |

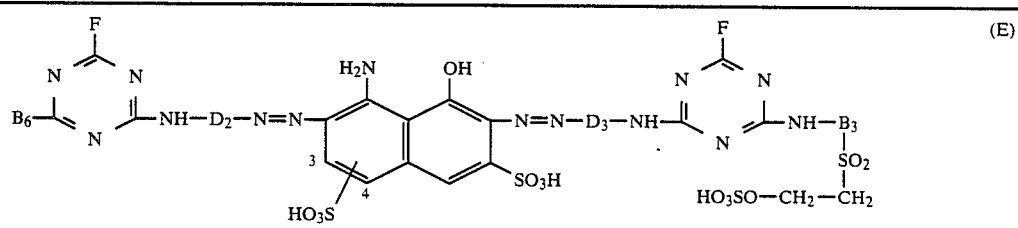
(E)

| Example | $B_6$ | $D_2$ | $D_3$ | $B_3$ | Position of $HO_3S-$ | Shade on cotton |
|---|---|---|---|---|---|---|
| 248 | CH$_2$–CH$_2$–NH–<br>\|<br>COOH | –⟨ ⟩–SO$_3$H | –⟨ ⟩–SO$_3$H | –⟨ ⟩– | 3 | greenish navy |
| 249 | ⟨ ⟩–NH–<br>\|<br>SO$_3$H | –⟨ ⟩–SO$_3$H | HO$_3$S–⟨ ⟩– | –⟨ ⟩– | 3 | black |
| 250 | ⟨ ⟩–NH–<br>\|<br>SO$_3$H | –⟨ ⟩– with SO$_3$H, SO$_3$H | –⟨ ⟩–SO$_3$H | –⟨ ⟩– | 3 | navy |
| 251 | H$_2$N– | –⟨ ⟩–SO$_3$H | HO$_3$S–⟨ ⟩– | –⟨ ⟩– | 3 | navy |

-continued (E)

Structure: B6—NH—C(=N-triazine-F)—NH—D2—N=N—[naphthalene with H2N, OH, HO3S at position 3/4, SO3H]—N=N—D3—NH—C(=N-triazine-F)—NH—B3—SO2—CH2—CH2—OSO3H

| Example | B6 | D2 | D3 | B3 | Position of HO3S— | Shade on cotton |
|---|---|---|---|---|---|---|
| 252 | C6H5—N(CH3)— | phenyl-SO3H | phenyl-SO3H | phenyl | 3 | greenish navy |
| 253 | HO3S—CH2—CH2—N(CH3)— | phenyl-SO3H | phenyl-SO3H | CH3O—phenyl—SO3H | 3 | greenish navy |
| 254 | HO—CH2—CH2—N(CH3)— | phenyl-1,4-(SO3H)2 | Cl-phenyl | phenyl | 4 | dark blue |
| 255 | 3-HO3S-phenyl-NH— | 2,5-(HO3S)2-phenyl | phenyl-SO3H | CH3-phenyl | 3 | black |
| 255a | 4-H2NOC-phenyl-NH— | 2,5-(SO3H)2-phenyl | phenyl-SO3H | phenyl | 3 | black |
| 255b | 4-HOOC-phenyl-NH— | 2,5-(SO3H)2-phenyl | phenyl-SO3H | phenyl | 3 | black |
| 255c | 3-H2NO2S-phenyl-NH— | 2,5-(SO3H)2-phenyl | phenyl-SO3H | phenyl | 3 | black |

EXAMPLE 256

The monoazo compound was prepared in accordance with the instructions of Example 1 and dissolved in 500 parts of water. The second coupling reaction was effected with a diazonium salt prepared as follows: 28.1 parts of aniline-4-β-sulfatoethyl sulfone were suspended in a mixture of 100 parts of water and 50 parts of ice and a neutral solution was formed by the addition of 7.3 parts of sodium carbonate. 20.3 parts by volume of an aqueous 5N sodium nitrite solution were then added, and this mixture was allowed to run into a mixture of 26 parts by volume of a 31% strength aqueous hydrochloric acid and 150 parts of ice. The resulting suspension was further stirred for one hour, excess nitrous acid was then destroyed with amidosulfonic acid, and the reaction product was adjusted to a pH value of 5.7 to 6.2 by means of 7 parts of sodium bicarbonate. The solution of the monoazo compound, as mentioned above, was added to the diazonium salt suspension thus prepared, and the pH value was maintained at 5.7 to 6.2 by the addition, in portions, of 16.3 parts of sodium bicarbonate. After stirring for several hours, the coupling was complete and the disazo compound formed was salted out with potassium chloride, filtered off with suction and dried.

A black powder was obtained which contained electrolyte and to an extent of about 45% alkali metal salt, predominantly the potassium salt, of the compound of the formula high degree of fixing and a good rinsability of the unfixed parts.

EXAMPLES 257 TO 265

The procedure followed was in a manner according to the invention, analogous to the method for preparing a disazo compound according to the invention, described in Example 256, but, instead of the reaction components indicated there, the reaction components given in the examples in the table below in conjunction with the general formula (F) (aniline compound having a β-sulfatoethylsulfonyl group, cyanuric fluoride and a diaminobenzene compound for preparing the condensation product which serves as the diazo component, 1-amino-8-naphthol-3,6- or 1-amino-8-naphthol-4,6-disulfonic acid and an aniline compound having a β-sulfatoethylsulfonyl group as the second diazo component) were used, and the disazo compounds according to the invention given in the examples in the table with reference to the formula (F) were obtained which had a very

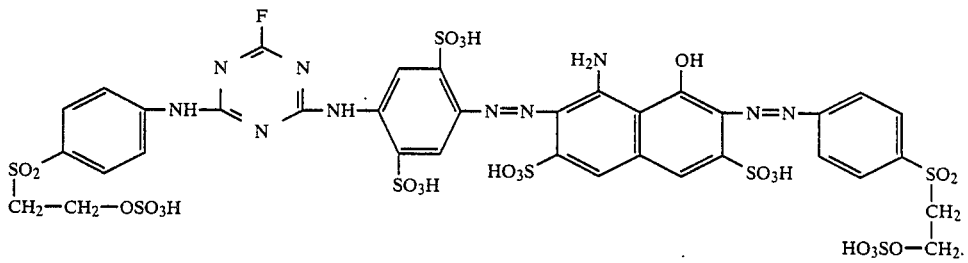

This compound had very good dyestuff properties and produced, by the application and fixing methods customary for fiber-reactive dyestuffs, on cellulose fiber materials deep black dyeings having very good end-use and manufacturing fastness properties, such as, in particular, very good fastness to washing, seawater and perspiration. In addition, the dyestuff also had a very good dyestuff properties and produced, by the application and fixing methods customary for fiber-reactive dyestuffs, intensely colored dyeings and prints, preferably on cellulose, fiber materials, having the shades indicated in the examples. These dyeings and prints likewise exhibited good fastness properties.

-continued

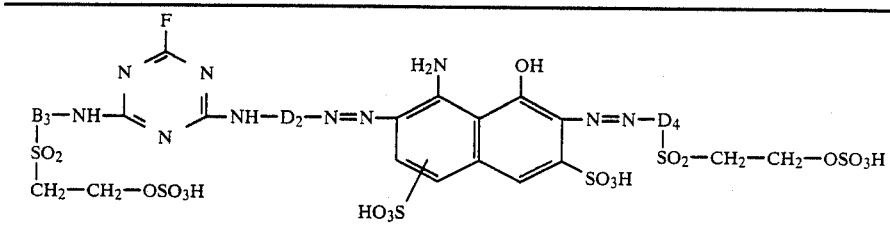
(F)

| Example | B₃ | D₂ | D₄ | Position of HO₃S— | Shade on cotton |
|---|---|---|---|---|---|
| 259 | phenyl | 2-SO₃H-phenyl | 2-Br-phenyl | 3 | black |
| 260 | phenyl | 2,5-di-SO₃H-phenyl | 2,4-di-Cl-phenyl | 3 | black |
| 261 | phenyl | 2-SO₃H-phenyl | 2,5-di-OCH₃-phenyl | 3 | greenish navy |
| 262 | phenyl | 2-SO₃H-phenyl | 2-OCH₃-5-CH₃-phenyl | 3 | navy |
| 263 | 2,5-di-OCH₃-phenyl | 2,5-di-SO₃H-phenyl | 4-CH₃-phenyl | 4 | reddish black |
| 264 | 4-OCH₃-phenyl | 2,5-di-SO₃H-phenyl | 2-OCH₃-phenyl | 3 | black |
| 265 | phenyl | 2-SO₃H-phenyl | phenyl | 3 | black |

EXAMPLE 266

A mixture of a neutral solution of 28.1 parts of aniline-4-β-sulfatoethyl sulfone in 150 parts of water and 20.3 parts by volume of an aqueous 5N sodium nitrite solution was allowed to run into a mixture of 26 parts by volume of aqueous 31% strength hydrochloric acid and 150 parts of ice, at 0° to 5° C. and with stirring. The resulting suspension was stirred for a further hour, and excess nitrous acid was destroyed with amidosulfonic acid. A solution of 31.9 parts of 1-amino-8-naphthol-3,6-disulfonic acid in 500 parts of water, which had been adjusted to a pH value of 4 by means of hyrochloric acid, was then added to start the coupling reaction. The pH value of the coupling batch was maintained at 3 to 3.5 by means of sodium acetate. After the first coupling reaction was complete, the monoazo compound formed was reacted with a diazonium salt solution in the second coupling reaction. This diazonium salt solution was prepared as follows: 13.7 parts of cyanuric fluoride were added dropwise in the course of 10–15 minutes at 0° C. to a neutral solution of 28.1 parts of aniline-4-$\beta$-sulfatoethyl sulfone in 100 parts of water, during which addition the pH value was maintained at about 6.0 by adding aqueous sodium hydroxide.

A neutral solution of 26.8 parts of 1,4-diaminobenzene-2,5-disulfonic acid in 200 parts of water was then added to the resulting suspension of the primary condensation product, and the mixture was stirred at 18° to 20° C. and at a pH value of 6.0 to 7.0. 250 parts of ice and thereafter 60 parts of aqueous 31% strength hydrochloric acid were added to the resulting clear solution of the secondary condensation product, and the condensation product was diazotized at 0° to 5° C. by the gradual addition of 20 parts by volume of an aqueous 5N sodium nitrite solution.

This diazonium salt solution was adjusted by means of sodium bicarbonate to a pH value of 5.5 to 6, and, as mentioned above, coupled with the monoazo compound, which coupling reaction was carried out at a pH value of 5.8 to 6.2. After stirring for several hours, the disazo compound formed was precipitated out with potassium chloride, filtered off with suction and dried.

A black powder was obtained which contained electrolyte and alkali metal salt, preferably the potassium salt, of the compound of the formula to an extent of about 50%. This disazo compound had very good dyestuff properties and, by the dyeing and printing methods customary for fiber-reactive dyestuffs, dyed cellulose fiber materials in black shades having very good end-use and manufacturing fastness properties.

EXAMPLES 267 TO 273

If the procedure according to the invention was used for preparing disazo compounds according to the invention, thus, for example, a procedure analogous to the abovementioned methods of the illustrative examples, preferably analogous to Example 266, and, for this purpose, corresponding reaction components were used (as the first diazo component an aniline having a $\beta$-sulfatoethylsulfonyl grouping, and as the second diazo component a reaction product from an aniline compound having a $\beta$-sulfatoethylsulfonyl group, cyanuric fluoride and diaminobenzene compound, and as coupling component 1-amino-8-naphthol-3,6- or -4,6-disulfonic acid), as can be seen from the examples in the table below in conjunction with the general formula (G), valuable disazo compound were obtained which are identified in the examples in the table below by means of the formula moieties of the formula (G) corresponding to the general formula (1), and which likewise have very good dyestuff properties and produce, by the application and fixing methods customary in industry for fiber-reactive dyestuffs, on cellulose fiber materials deep, fast dyeings and prints having the shades indicated in the examples.

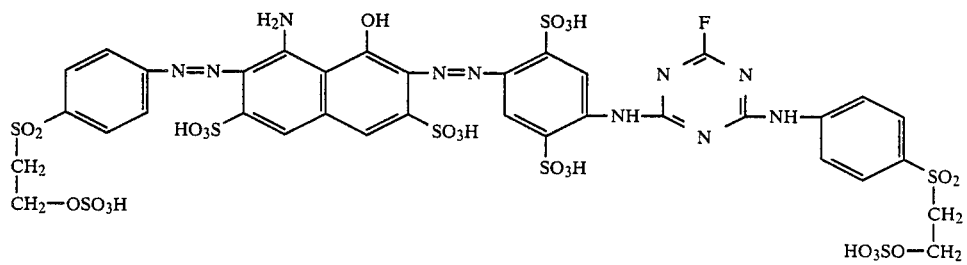

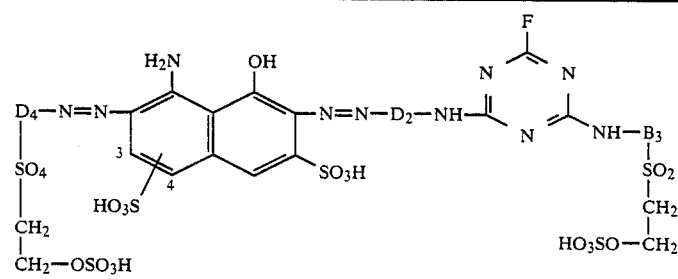

| Example | D4 | D2 | B3 | Position of HO3S— | Shade on cotton |
| --- | --- | --- | --- | --- | --- |
| 267 | SO3H (phenyl) | SO3H (phenyl) | (phenyl) | 3 | black |

-continued

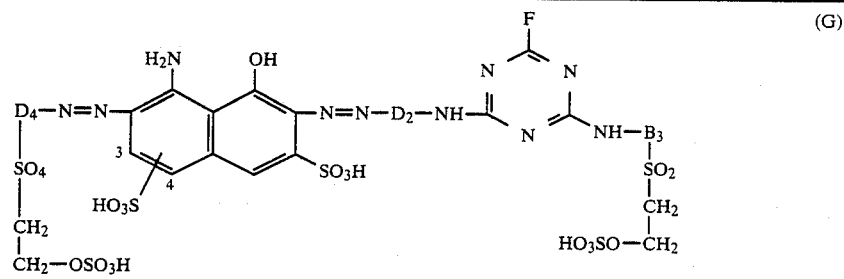
(G)

| Example | D₄ | D₂ | B₃ | Position of HO₃S— | Shade on cotton |
|---------|-----|-----|-----|-------------------|-----------------|
| 268 | 4-Br-phenyl | 2,5-disulfo-phenyl | phenyl | 3 | greenish black |
| 269 | phenyl | 2-sulfo-phenyl | 4-methoxy-phenyl | 3 | navy |
| 270 | 3,5-dichloro-phenyl | 2,4-disulfo-phenyl | 2-methoxy-5-methyl-phenyl | 3 | dark blue |
| 271 | 4-sulfo-phenyl | 2-sulfo-phenyl | phenyl | 4 | navy |
| 272 | phenyl | 2-sulfo-phenyl | 2,5-dimethoxy-phenyl | 3 | black |
| 273 | phenyl | 2,5-disulfo-phenyl | 4-methyl-phenyl | 4 | black |
| 273a | phenyl | 4-sulfo-phenyl | phenyl | 3 | navy |
| 273b | phenyl | 3-sulfo-phenyl | phenyl | 3 | navy |

EXAMPLE 274

To prepare a disazo compound according to the invention the procedure of Example 266 was followed, but instead of the aniline-4-β-sulfatoethyl sulfone compound 26.5 parts of aniline-4-β-phosphatoethyl sulfone were used. This produced an alkali metal salt of the compound of the formula

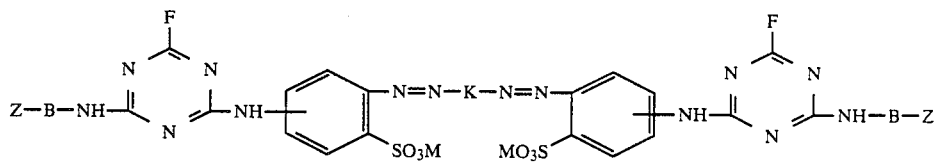

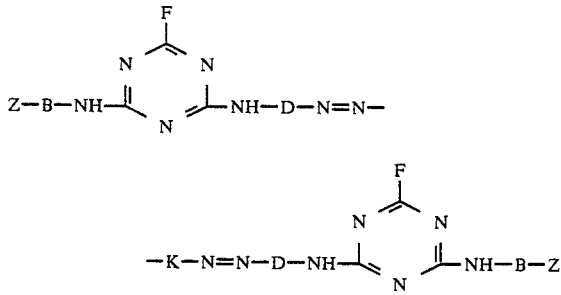

which had similarly good dyestuff properties as the disazo dyestuff of Example 266.

We claim:

1. A water-soluble disazo compound of the formula

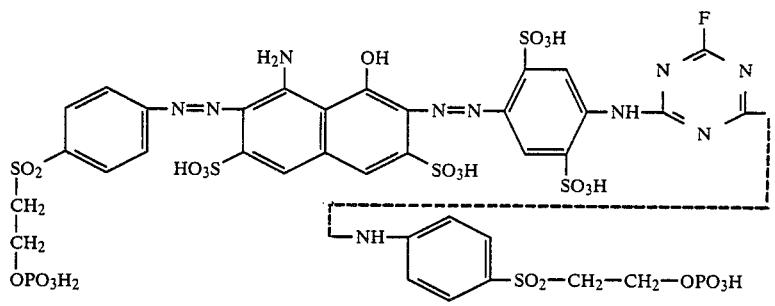

in which
- B is phenylene unsubstituted or substituted by 1 sulfo group or by 1 methyl group or 1 methoxy group or 1 chlorine atom or 2 methoxy groups or 1 methoxy group and 1 methyl group, and the two formula moieties B are identical to or different from one another,
- D is phenylene unsubstituted or substituted by 1 or 2 sulfo groups and the two formula moieties D are identical to or different from one another,
- K represents, as the bivalent radical of a coupling component, the bivalent radical of 1-amino-8-naphthol-4,6-disulfonic acid, and
- Z is β-phosphatoethylsulfonyl, β-sulfatoethylsulfonyl or vinylsulfonyl, or an alkali metal salt thereof.

2. A compound according to claim 1 of the formula in which B, K and Z are defined as in claim 1 and M is hydrogen or an alkali metal, and the free amino groups are bonded to the benzene ring in the meta- or para-position relative to the azo group.

3. A compound according to claim 1 in which Z is β-sulfatoethylsulfonyl.

4. A water-soluble disazo compound of the formula

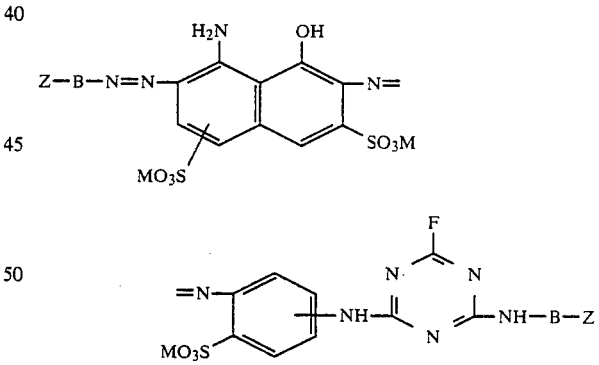

in which
- B is phenylene unsubstituted or substituted by 1 sulfo group or by 1 methyl group or 1 methoxy group or 1 chlorine atom or 2 methoxy groups or 1 methoxy group and 1 methyl group, and the two formula moieties B are identical to or different from one another,
- Z is β-phosphatoethylsulfonyl, β-sulfatoethylsulfonyl or vinylsulfonyl,
- M is hydrogen or an alkalimetal, and
- the free amino group is bonded to the benzene ring in the meta- or para-position relative to the azo group.

5. A compound according to claim 4, of the formula

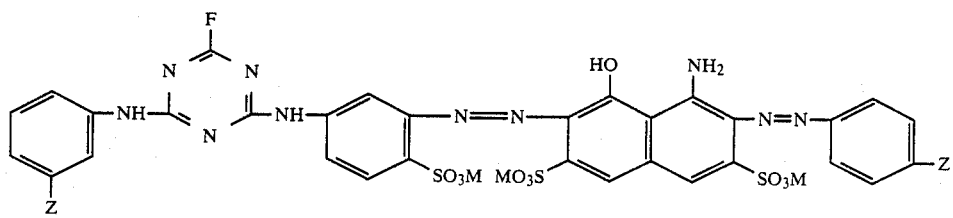
in which M and Z are defined as in claim 4.
6. A compound according to claim 4, of the formula
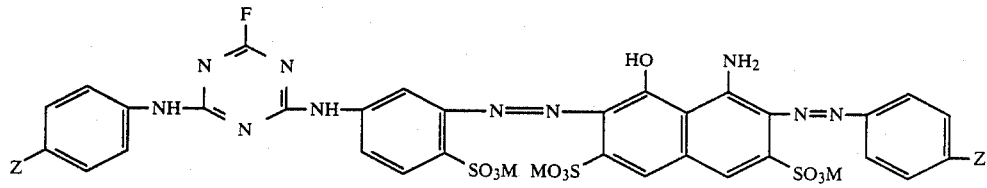
in which M and Z are defined as in claim 4.
7. A compound according to claim 4 in which Z is β-sulfatoethylsulfonyl.
8. A compound according to claim 4 in which M is sodium or potassium.
9. A water soluble disazo compound of the formula
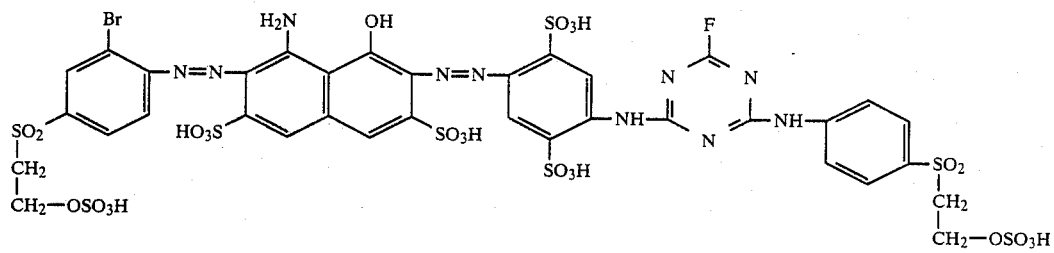
or an alkali metal salt thereof.
* * * * *